United States Patent
Islam et al.

(10) Patent No.: US 11,683,828 B2
(45) Date of Patent: *Jun. 20, 2023

(54) SYSTEM AND METHOD FOR COEXISTENCE OF LOW LATENCY AND LATENCY TOLERANT COMMUNICATIONS

(71) Applicant: Huawei Technologies Co., Ltd., Shenzhen (CN)

(72) Inventors: Toufiqul Islam, Ottawa (CA); Amine Maaref, Ottawa (CA); Jiayin Zhang, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 18 days.

This patent is subject to a terminal disclaimer.

(21) Appl. No.: 17/092,758

(22) Filed: Nov. 9, 2020

(65) Prior Publication Data
US 2021/0058937 A1    Feb. 25, 2021

Related U.S. Application Data

(63) Continuation of application No. 15/909,399, filed on Mar. 1, 2018, now Pat. No. 10,863,522.
(Continued)

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS 6,154,459 A    11/2000  Wicklund
2014/0071878 A1  3/2014  Xu et al.
(Continued)

FOREIGN PATENT DOCUMENTS

CN    103051413 A    4/2013
CN    106455103 A    2/2017
(Continued)

OTHER PUBLICATIONS

WO 2016112131 A1 (Year: 2016).*
(Continued)

*Primary Examiner* — Walter J Divito
(74) *Attorney, Agent, or Firm* — Slater Matsil, LLP

(57) ABSTRACT

Systems and methods are provided for transmitting and receiving pre-emption indications. The pre-emption indication is transmitted every K symbols or slots, on a group-common physical downlink control channel. The pre-emption indication is in respect of a group of K symbols or slots preceding a symbol or slot containing the group-common pre-emption indication. The group-common pre-emption indication indicates, for the group of K symbols or slots, which resources are pre-empted. The base station schedules resources for first downlink traffic, and transmits the scheduled first downlink traffic subject to pre-emption, and transmits second downlink traffic by pre-empting resources for the first downlink traffic. On the UE side, the UE receives the pre-emption indication. The UE receives its scheduled traffic taking into account the pre-emption indication.

34 Claims, 10 Drawing Sheets

Related U.S. Application Data

(60) Provisional application No. 62/500,904, filed on May 3, 2017.

(51) Int. Cl.

| | | |
|---|---|---|
| *H04W 72/23* | (2023.01) | |
| *H04W 72/51* | (2023.01) | |
| *H04W 72/56* | (2023.01) | |
| *H04W 72/0446* | (2023.01) | |
| *H04W 72/0453* | (2023.01) | |

(52) U.S. Cl.
CPC .......... *H04W 72/23* (2023.01); *H04W 72/51* (2023.01); *H04L 5/0007* (2013.01); *H04L 5/0051* (2013.01); *H04W 72/0446* (2013.01); *H04W 72/0453* (2013.01); *H04W 72/56* (2023.01)

(56) References Cited

U.S. PATENT DOCUMENTS

| | | |
|---|---|---|
| 2015/0163022 A1 | 6/2015 | Johansson et al. |
| 2016/0212625 A1 | 7/2016 | Damnjanovic et al. |
| 2017/0054535 A1 | 2/2017 | Lim et al. |
| 2019/0116586 A1 | 4/2019 | Basu Mallick et al. |
| 2019/0268930 A1* | 8/2019 | Rudolf .................. H04W 72/14 |
| 2019/0274153 A1 | 9/2019 | Park et al. |
| 2019/0280802 A1 | 9/2019 | Ma et al. |

FOREIGN PATENT DOCUMENTS

| | | |
|---|---|---|
| CN | 106559890 A | 4/2017 |
| EP | 2810394 A1 | 12/2014 |
| KR | 20140093273 A | 7/2014 |
| KR | 20160046904 A | 4/2016 |
| KR | 20170033416 A | 3/2017 |
| RU | 2602808 C1 | 11/2016 |
| WO | 2012155408 A1 | 11/2012 |
| WO | 2013055193 A2 | 4/2013 |
| WO | 2013096551 A1 | 6/2013 |
| WO | 2013113712 A1 | 8/2013 |
| WO | 2016118329 A1 | 7/2016 |
| WO | 2016208991 A1 | 12/2016 |

OTHER PUBLICATIONS

"RAN1 Chairman's Notes", 3GPP TSG RAN WG1 Meeting NR Ad-Hoc, Jan. 16-20, 2017, 61 Pages, Spokane, USA.

"RAN1 Chairman's Notes", 3GPP TSG RAN WG1 Meeting #88, Feb. 13-17, 2017, 109 pages, Athens, Greece.

Huawei, et al., WF on pre-emption indication, 3GPP TSG RAN WG1 Meeting #88bis, R1-1706481, Apr. 3-7, 2017, 3 Pages, Spokane, USA.

Intel Corporation, "eMBB/URLLC multiplexing for DL", 3GPP TSG RAN1 WG Meeting #88bis, R1-1704763, Apr. 3-7, 2017, 6 Pages, Spokane, USA.

LG Electronics, et al., "WF on Supporting URLLC in NR", 3GPP TSG RAN WG1 Meeting #86, R1-168550, Aug. 22-26, 2016, 2 Pages, Gothenburg, Sweden.

LG Electronics, "Discussion on indication method for impacted resources for downlink", 3GPP TSG RAN WG1 Meeting #88bis, R1-1704922, Apr. 3-7, 2017, 9 Pages, Spokane, USA.

Mediatek Inc., "On eMBB/URLLC DL Multiplexing Indication", 3GPP TSG RAN WG1 Meeting #88bis, R1-1704474, Apr. 3-7, 2017, 5 Pages, Spokane, USA.

Qualcomm Incorporated, "URLLC DL control and indication channel", 3GPP TSG-RAN WG1 #88b, R1-1705608, Apr. 3-7, 2017, 7 Pages, Spokane, USA.

Huawei, et al.,"On pre-emption indication for DL multiplexing of URLLC and eMBB", 3GPP TSG RAN WG1 Meeting #88bis, R1-1704215, Apr. 3-7, 2017, 5 pages, Spokane, USA.

Huawei, et al., "On pre-emption indication for DL multiplexing of URLLC and eMBB", 3GPP TSG RAN WG1 Meeting #89, R1-1708124, May 15-19, 2017, 9 pages, Hangzhou, China.

Huawei, et al.,"Discussion on configuration and design of group common pre-emption Indication", 3GPP TSG RAN WG1 Meeting #90, R1-1713754, Aug. 21-25, 2017, 8 pages, Prague, Czech Republic.

Samsung, "Summary of e-mail discussions on multiplexing eMBB and URLLC in DL", TSG-RAN WG1 NR Ad-hoc Meeting, R1-1700972, Spokane, USA, Jan. 16-20, 2017, total 23 pages.

Qualcomm Incorporated, "DL URLLC/eMBB dynamic multiplexing and indication design", 3GPP TSG-RAN WG1 #88, R1-1702639, Feb. 13-17, 2017, Athens, Greece, total 9 pages.

Nokia et al., "On indication for downlink punctured / preemptive scheduling", 3GPP TSG-RAN WG1#88-BIS, R1-1705247, Spokane, WA, United States, Apr. 3-7, 2017, total 4 pages.

Samsung, "On signalling design for indicating eMBB puncturing", 3GPP TSG RAN WG1 Meeting #88bis, R1-1705415, Spokane, USA, Apr. 3-7, 2017, total 4 pages.

Wilus Inc., "Consideration on Common PDCCH for NR", 3GPP TSG RAN WG1 Meeting #88bis, R1-1705847, Spokane, USA, Apr. 3-7, 2017, total 5 pages.

\* cited by examiner

SYSTEM AND METHOD FOR COEXISTENCE OF LOW LATENCY AND LATENCY TOLERANT COMMUNICATIONS

CROSS-REFERENCE TO RELATED APPLICATIONS

This application is a continuation of U.S. patent application Ser. No. 15/909,399, filed on Mar. 1, 2018, entitled "System and Method for Coexistence of Low Latency and Latency Tolerant Communications," which claims the benefit of U.S. Provisional Application No. 62/500,904, filed on May 3, 2017, entitled "System and Method for Coexistence of Low Latency and Latency Tolerant Communications," applications of which are incorporated herein by reference in their entireties.

TECHNICAL FIELD

The application relates to systems and methods for the coexistence of low latency and latency tolerant communications.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

A base station allocates resources for downlink communications to the UEs served by the base station. The downlink communications may be performed by transmitting orthogonal frequency-division multiplexing (OFDM) symbols.

Some UEs served by a base station may need to receive data from the base station with lower latency than other UEs served by the base station. For example, a base station may serve multiple UEs, including a first UE and a second UE. The first UE may be a mobile device carried by a human who is using the first UE to browse on the Internet. The second UE may be equipment on an autonomous vehicle driving on a highway. Although the base station is serving both UEs, the second UE may need to receive data with lower latency compared to the first UE. The second UE may also need to receive its data with higher reliability than the first UE. The second UE may be an ultra-reliable low latency communication (URLLC) UE, whereas the first UE may be an enhanced mobile broadband (eMBB) UE.

UEs that are served by a base station and that require lower latency downlink communication will be referred to as "low latency UEs". The other UEs served by the base station will be referred to as a "latency tolerant UEs". Data to be transmitted from the base station to a low latency UE will be referred to as "low latency data", and data to be transmitted from the base station to a latency tolerant UE will be referred to as "latency tolerant data". A single UE may use both low latency communication and latency tolerant communication, in which case the term "low latency UE" would refer to the activities of the single UE for the purpose of low latency communication, and the term "latency tolerant UE" would refer to the activities of the single UE for the purpose of latency tolerant communication.

It is desired to have a base station and frame structure that can accommodate the use of the same time-frequency resources by both low latency UEs and latency tolerant UEs.

SUMMARY

According to one aspect of the present invention, there is provided a method comprising: every K symbols or slots, on a group-common physical downlink control channel, transmitting a group-common pre-emption indication in respect of a group of K symbols or slots preceding a symbol or slot containing the group-common pre-emption indication; the group-common pre-emption indication indicating, for the group of K symbols or slots, which resources are pre-empted.

Optionally, transmitting the group-common pre-emption indication comprises transmitting using a control resource set within the group-common physical downlink control channel.

Optionally, the method further comprises transmitting a configuration of a value for K.

Optionally, for each transmitted group-common pre-emption indication, the group of K symbols or slots is the last K symbols or slots preceding the symbol or slot containing the group-common pre-emption indication information.

Optionally, the method further comprises transmitting signalling configuring the control resource set to be used to transmit the pre-emption indication.

Optionally, the group-common pre-emption indication contains N bits, each bit indicating pre-emption to a defined granularity in time and/or frequency.

Optionally, the method further comprises transmitting signaling that configures the defined granularity.

Optionally, the group-common pre-emption indication contains multiple fields; the method further comprising transmitting signalling to a UE indicating which of the multiple fields are relevant to the UE.

Optionally, the method further comprises transmitting a respective group-common pre-emption indication for each of a plurality of bandwidth parts.

Optionally, when the pre-emption indication is one of a first set of values, the pre-emption indication indicates pre-empted resources that are contiguous; and when the pre-emption indication is one of a second set of values, the pre-emption indication indicates pre-empted resources that are non-contiguous.

According to another aspect of the present invention, there is provided a method in a user equipment (UE), the method comprising: every K symbols or slots, on a group-common physical downlink control channel, receiving a group-common pre-emption indication in respect of a group of K symbols or slots preceding a symbol or slot containing the group-common pre-emption indication; the group-common pre-emption indication indicating, for the group of K symbols or slots, which resources are pre-empted.

Optionally, receiving the group-common pre-emption indication comprises receiving using a control resource set within the group-common physical downlink control channel.

Optionally, the method further comprises receiving a configuration of a value for K.

Optionally, for each received group-common pre-emption indication, the group of K symbols or slots is the last K symbols or slots preceding the symbol or slot containing the group-common pre-emption indication information.

Optionally, the method further comprises receiving signalling configuring the control resource set to be used to transmit the pre-emption indication.

Optionally, the group-common pre-emption indication contains N bits, each bit indicating pre-emption to a defined granularity in time and/or frequency.

Optionally, the method further comprises receiving signaling that configures the defined granularity.

Optionally the group-common pre-emption indication contains multiple fields; the method further comprising receiving signalling indicating which of the multiple fields are relevant to a UE receiving the signalling.

Optionally, a respective group-common pre-emption indication is transmitted for each of a plurality of bandwidth parts, the method comprising the UE monitoring any group-common pre-emption indication in respect of bandwidth parts used by the UE.

Optionally, when the pre-emption indication is one of a first set of values, the pre-emption indication indicates pre-empted resources that are contiguous; and when the pre-emption indication is one of a second set of values, the pre-emption indication indicates pre-empted resources that are non-contiguous.

According to another aspect of the present invention, there is provided a base station comprising: a transmit chain configured to, every K symbols or slots, on a group-common physical downlink control channel, transmit a group-common pre-emption indication in respect of a group of K symbols or slots preceding a symbol or slot containing the group-common pre-emption indication; the group-common pre-emption indication indicating, for the group of K symbols or slots, which resources are pre-empted.

Optionally, the method further comprises a scheduler configured to schedule resources for first downlink traffic; the transmit chain further configured to transmit the scheduled first downlink traffic subject to pre-emption, and to transmit second downlink traffic by pre-empting resources for the first downlink traffic.

Optionally, the transmit chain is configured to transmit the group-common pre-emption indication using a control resource set within the group-common physical downlink control channel.

Optionally, the base station is further configured to transmit a configuration of a value for K.

Optionally, for each transmitted group-common pre-emption indication, the group of K symbols or slots is the last K symbols or slots preceding the symbol or slot containing the group-common pre-emption indication information.

Optionally, the base station is further configured to transmit signalling configuring the control resource set to be used to transmit the pre-emption indication.

Optionally, the group-common pre-emption indication contains N bits, each bit indicating pre-emption to a defined granularity in time and/or frequency.

Optionally, the base station is further configured to transmit signaling that configures the defined granularity.

Optionally, the group-common pre-emption indication contains multiple fields; the base station further configured to transmit signalling to a UE indicating which of the multiple fields are relevant to the UE.

Optionally, the base station is further configured to transmit a respective group-common pre-emption indication for each of a plurality of bandwidth parts.

Optionally, when the pre-emption indication is one of a first set of values, the pre-emption indication indicates pre-empted resources that are contiguous; and when the pre-emption indication is one of a second set of values, the pre-emption indication indicates pre-empted resources that are non-contiguous.

According to another aspect of the present invention, there is provided a user equipment in a user equipment (UE), the user equipment comprising: a receive chain configured to, every K symbols or slots, on a group-common physical downlink control channel, receive a group-common pre-emption indication in respect of a group of K symbols or slots preceding a symbol or slot containing the group-common pre-emption indication; the group-common pre-emption indication indicating, for the group of K symbols or slots, which resources are pre-empted.

Optionally, the receive chain is configured to receive downlink scheduling information that schedules first downlink traffic for the UE; the receive chain comprising a subcarrier de-mapper that performs sub-carrier de-mapping based on the received downlink scheduling information, taking into account also the received group-common pre-emption indication.

Optionally, the receive chain is configured to receive the group-common pre-emption indication by receiving using a control resource set within the group-common physical downlink control channel.

Optionally, the user equipment is further configured to receive a configuration of a value for K.

Optionally, for each received group-common pre-emption indication, the group of K symbols or slots is the last K symbols or slots preceding the symbol or slot containing the group-common pre-emption indication information.

Optionally, the user equipment is further configured to receive signalling configuring the control resource set to be used to transmit the pre-emption indication.

Optionally, the group-common pre-emption indication contains N bits, each bit indicating pre-emption to a defined granularity in time and/or frequency.

Optionally, the user equipment is further configured to receive signaling that configures the defined granularity.

Optionally, the group-common pre-emption indication contains multiple fields; the user equipment further configured to receive signalling indicating which of the multiple fields are relevant to a UE receiving the signalling.

Optionally, a respective group-common pre-emption indication is transmitted for each of a plurality of bandwidth parts, the user equipment further configured to monitor any group-common pre-emption indication in respect of bandwidth parts used by the UE.

Optionally, when the pre-emption indication is one of a first set of values, the pre-emption indication indicates pre-empted resources that are contiguous; and when the pre-emption indication is one of a second set of values, the pre-emption indication indicates pre-empted resources that are non-contiguous.

According to one aspect of the present invention, there is provided a method in a user equipment, the method comprising: receiving downlink control information comprising a pre-emption indicator having at least: a HARQ process identifier; N bits to indicate time-frequency regions of a previously scheduled transmission that were impacted by pre-emption.

In some embodiments, the method further comprises receiving a configuration of N.

In some embodiments, the pre-emption indicator is only received in respect of an impacted transmission for which there is a subsequent transmission in respect of the impacted transmission.

In some embodiments, wherein the downlink control information contains a HARQ process identifier and/or a resource allocation to schedule the subsequent transmission.

In some embodiments, the existence of the pre-emption indicator also serves to indicate the subsequent transmission is not a new transmission.

In some embodiments, the downlink control information further comprises: a resource allocation and/or a HARQ process identifier for a new transmission.

According to another aspect of the present invention there is provided the method comprising: receiving downlink control information comprising a redundancy version index that indicates pre-emption in respect of a previously scheduled transmission.

In some embodiments, each redundancy version index is in respect of a respective redundancy version composed of one or more code block groups.

In some embodiments, the received redundancy version index indicates a redundancy version that best matches impacted code block groups.

In some embodiments, the redundancy version index is one of K options, where M out of the K options indicate TB-level subsequent transmission and K-M options out of the K options indicate CBG-based subsequent transmission.

According to another aspect of the present invention, there is provided a method in a user equipment, the method comprising: receiving downlink control information comprising a redundancy version index; wherein for a new transmission, the redundancy version index indicates transport block-level transmission, where a redundancy version corresponds to a set of encoded bits that forms a transport block; wherein for a retransmission, the redundancy version index refers to CBG-level retransmission, where different redundancy versions map to different combinations of CBGs.

In some embodiments, when received in respect of pre-empted resources, the redundancy version index functions as a pre-emption indication to indicate pre-empted resources; when received in respect of a retransmission received based on HARQ feedback, the redundancy version functions to indicate which CBGs are re-transmitted following an initial transmission.

According to another aspect of the present invention, there is provided a method in a UE, the method comprising: receiving downlink control information in respect of a retransmission, the downlink control information comprising: a first field that indicates whether the retransmission is based on pre-emption or not; when the first field indicates pre-emption, a second field to indicate pre-empted resources; when the first field does not indicate pre-emption, the second field is used for TB-level transmission to indicate which redundancy version is transmitted or to indicate which CBGs are retransmitted.

According to another aspect of the present invention, there is provided a method in a UE, the method comprising: receiving a single downlink control information that includes scheduling for one or a combination of: one or multiple retransmissions due to pre-emption; one or more retransmissions based on HARQ feedback; one or more new transmissions.

In some embodiments, the DCI comprises: indication of HARQ process IDs, both for re-transmission HARQ process and new transmission HARQ process; and/or redundancy version information, both for re-transmission HARQ process and new transmission HARQ process.

In some embodiments, the DCI further comprises: an indication of which CBGs or symbols of previous transmission are being re-transmitted; and/or new data indicator (NDI) bits for CBG-based re-transmission.

According to another aspect of the present invention, there is provided a method in a UE comprising: monitoring a group-common physical downlink control channel (PDCCH) transmitted every K symbols or slots or every X ms, the group-common PDDCH containing pre-emption information for a group of UEs.

In some embodiments, monitoring by the UE is performed based on a monitoring period that is one of: UE specific; Cell specific; Group specific.

In some embodiments, the pre-emption information indicates pre-empted/impacted areas of transmissions over a group of symbols that appeared before a symbol that contains the group-common PDCCH.

In some embodiments, the group-common PDCCH contains an indication of pre-emption information related to transmissions over a preceding K symbols.

In some embodiments, the group-common PDCCH is transmitted every K symbols to notify the UEs having ongoing transmission that some part of scheduled resources over a following group of symbols are pre-empted and assigned to another DL transmission.

In some embodiments, the group-common PDCCH contains M UE-specific fields.

According to another aspect of the present invention, there is provided a method in a UE, the method comprising: receiving a downlink control information (DCI) of a transport block having at least a first part and a second part; wherein the first part of the DCI provides scheduling information of the transport block and is received at the beginning of a transmission interval or duration; wherein the second part of the DCI notifies the UE of whether pre-emption that has occurred during scheduled transmission of the transport block; the method further comprising, if the second part does notify that pre-emption has occurred, monitoring a group-common PDCCH in one or more of the subsequent symbols to obtain more detailed pre-emption information.

In some embodiments, the group-common PDCCH falls inside a packet data shared channel of an eMBB transmission, and the UE is configured with the following behavior: UE blindly detects the group-common PDCCH in the pre-configured search space which can be used for PDSCH; or the group-common PDCCH is in a reserved location in a pre-configured control resource set area that is avoided for PDSCH scheduling; or the group-common PDCCH is superposed with PDSCH transmission.

In some embodiments, MIMO transmission is used in an area of overlap between the group-common PDCCH and the PDSCH transmission.

According to another aspect of the present invention, there is provided a method in a UE, the method comprising: receiving a transmission that may or may not be subject to interference due to a transmission to another UE on another MIMO layer; receiving an indication message containing beam related information in respect of the transmission that indicates the transmission is impacted by transmission in another MIMO layer.

In some embodiments, the pre-emption indication message also indicates an impacted time and/or frequency resource.

In some embodiments, the pre-emption indication message comprises beamforming information and/or interference channel information to facilitate interference cancellation by the UE.

In some embodiments, the method further comprises performing beam forming based on the beamforming information and/or performing interference cancellation based on the interference channel information.

In some embodiments, the interference channel information comprises information related to a demodulation reference signal (DM-RS) used by a base station in respect of transmitting to another UE on another MIMO layer.

In some embodiments, the interference channel information comprises at least one of the time, frequency, code, sequence resources used to send the DM-RS such that the UE can detect the DM-RS.

According to another aspect of the present invention, there is provided a method in a UE, the method comprising: receiving a transmission that may or may not be subject to interference from a transmission on another MIMO layer to a different UE; performing blind detection of DM-RS transmission in respect of the transmission on the other MIMO layer to the different UE, and upon detecting the DM-RS, performing beamforming or interference cancellation based on the detected DM-RS.

In some embodiments, performing blind detection comprises: based on a set of possible DM-RS ports, the UE blindly attempting to perform the DM-RS decoding for each possible DM-RS port.

According to another aspect of the present invention, there is provided a method in a UE, the method comprising: receiving downlink control information comprising an indication of a start position and/or duration in respect of a symbol-based transmission that may impact time-frequency resources of a transmission to the UE.

In some embodiments, the indication comprises: a start position field of $\log_2 K$ bits to indicate one of the K possible start positions a length field containing $\log_2 M$ bits to indicate length.

In some embodiments, the method further comprises receiving a granularity indication in respect of the length field, either as part of the downlink control information in or in higher layer signalling.

According to another aspect of the present invention, there is provided a method in a UE, the method comprising: performing any one or a combination of two or more methods described herein.

According to another aspect of the present invention, there is provided a UE configured to perform one of methods summarized above or described herein.

According to another aspect of the present invention, there is provided a base station configured to transmit to latency tolerant and latency intolerant UEs in accordance with any one or a combination of two or more of the methods described herein.

BRIEF DESCRIPTION OF THE DRAWINGS

Embodiments of the disclosure will now be described with reference to the attached drawings in which.

DETAILED DESCRIPTION OF ILLUSTRATIVE EMBODIMENTS

Figure 1:
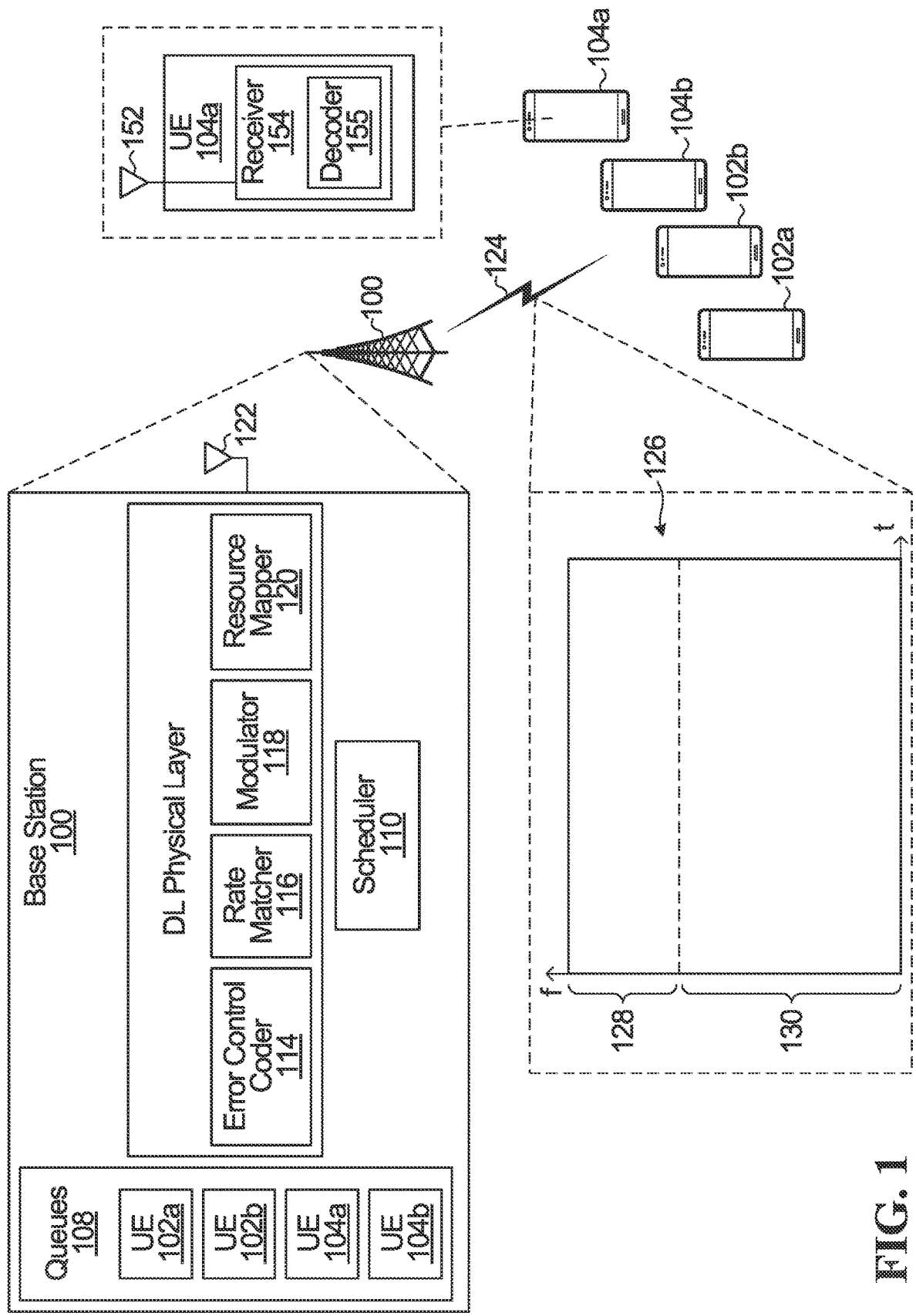
FIG. 1 is a block diagram of a base station and UEs according to an embodiment of the invention.

Generally, embodiments of the present disclosure provide a method and system for coexistence of low latency and latency tolerant communications. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

In the detailed examples that follow, the low latency traffic is assumed to be URLLC, and the latency tolerant traffic is assumed to be eMBB, but it should be understood that these embodiments are applicable to low latency traffic generally, and latency tolerant traffic generally.

The examples mentioned below can be applicable to any duplex system, frequency division duplex, time division duplex, unified duplex etc.

FIG. 1 is a block diagram of a base station 100, as well as four UEs 102a, 102b, 104a, and 104b served by the base station 100, according to one embodiment. UEs 102a and 102b are low latency UEs, and UEs 104a and 104b are latency tolerant UEs. That is, UEs 102a and 102b require lower latency downlink communication compared to UEs 104a and 104b. For example, UEs 102a and 102b may be URLLC UEs, and UEs 104a and 104b may be eMBB UEs. Although the base station 100 only serves four UEs in FIG. 1, in actual operation the base station 100 may serve many more UEs. It is also contemplated that a single UE might be served by more than one base station 100. Downlink transmissions to the latency tolerant UEs are typically grant-based, but may be grant-free. Also, downlink transmissions to the low latency UEs may be grant-based or grant-free.

The base station 100 includes queues 108 for storing data to be sent to UEs served by the base station 100. The queues 108 may be implemented by memory, e.g., physical registers. The base station 100 further includes a scheduler 110 for scheduling UEs on available resources. The base station 100 further includes processing blocks for implementing the downlink physical layer, such as an error control coder 114, a rate matcher 116, a modulator 118, and a resource mapper 120. The downlink physical layer of the base station 100 may include other processing blocks, but these have been omitted for the sake of clarity.

The scheduler 110, error control coder 114, rate matcher 116, modulator 118, and resource mapper 120 may each be implemented by a processor that executes instructions that cause the processor to perform the operations of the scheduler 110, error control coder 114, rate matcher 116, modulator 118, and resource mapper 120. The same or different processor may be used to implement each of the scheduler 110, error control coder 114, rate matcher 116, modulator 118, and resource mapper 120. Alternatively, the scheduler 110, error control coder 114, rate matcher 116, modulator 118, and/or resource mapper 120 may be implemented using dedicated integrated circuitry, such as an application specific integrated circuit (ASIC), a graphics processing unit (GPU), or a programmed field programmable gate array (FPGA) for performing the functions of the scheduler 110, error control coder 114, rate matcher 116, modulator 118, and/or resource mapper 120.

The base station 100 further includes one or more antennas 122 to wirelessly transmit signals carrying data for UEs 102a, 102b, 104a, and 104b. Only one antenna 122 is illustrated. The base station 100 may include other circuitry and/or modules for performing other functions, e.g. for uplink communication, but these have been omitted for the sake of clarity.

The term "base station" encompasses any device that wirelessly communicates with UEs using uplink and downlink communications. Therefore, in some implementations, the base station 100 may be called other names, such as a transmit and receive point (TRP), a base transceiver station, a radio base station, a network node, a transmit/receive node, a Node B, an eNodeB (eNB), a gNB, a relay station, or a remote radio head. Also, in some embodiments, the parts of the base station 100 may be distributed. For example, some of the modules/processing blocks of the base station 100 may be located remote from the equipment housing the antennas of the base station 100, and may be coupled to the equipment housing the antennas over a communication link (not shown). Therefore, in some embodiments, the term base station 100 may also refer to modules/processing blocks on the network side that perform processing operations, such as scheduling and downlink control signal generation, and that are not necessarily part of the equipment housing the antennas of the base station 100. The modules/processing blocks may also be coupled to other base stations. In some embodiments, the base station 100 may actually be a plurality of base stations that are operating together to serve the UEs, e.g. through coordinated multipoint transmissions.

UEs 102a,102b,104a,104b are meant to be illustrative of any end user devices which may be configured as disclosed herein for uplink/downlink communication with BS 100. Examples of user devices include wireless transmit/receive units (WTRUs), mobile stations, wireless devices, fixed or mobile subscriber units, cellular telephones, personal digital assistants (PDAs), smart phones, laptops, computers, touchpads, wireless sensors, and consumer electronics devices.

As noted above, UEs 102a,102b are UEs that may require low latency, and have sporadic traffic requirements, and UEs 104a,104b are UEs that may not have as tight a latency requirement, and may have more consistent traffic requirements, at least when active. In a more specific example, the UEs 102a,102b employ orthogonal frequency division multiplexing (OFDM) to transmit URLLC traffic. It is contemplated that OFDM may be used in combination with orthogonal multiple access or a non-orthogonal multiple access scheme such as Sparse Code Multiple Access (SCMA), Interleave-Grid Multiple Access (IGMA), Multi-user shared access (MUSA), Low code rate spreading, Frequency domain spreading, Non-orthogonal coded multiple access (NCMA), Pattern division multiple access (PDMA), Resource spread multiple access (RSMA), Low density spreading with signature vector extension (LDS-SVE), Low code rate and signature based shared access (LSSA), Non-orthogonal coded access (NOCA), Interleave Division Multiple Access (IDMA), Repetition division multiple access (RDMA) and Group Orthogonal Coded Access (GOCA). UEs 104a,104b, for example, transmit enhanced mobile broadband (eMBB) traffic. UEs 104a,104b may also use OFDM in combination with orthogonal multiple access or a non-orthogonal multiple access scheme.

When the base station 100 has data to transmit to UEs 102a, 102b, 104a, and/or 104b, the base station 100 transmits this data in one or more downlink transmissions using allocated resources. A set of time frequency resources 126 is divided into a coexistence bandwidth partition 128, and a latency tolerant bandwidth partition 130. The resources within the coexistence partition 128 are available for transmission of both low latency downlink traffic and latency tolerant downlink traffic, while the latency tolerant partition is available for transmission of latency tolerant downlink traffic.

In operation, data that is to be transmitted from the base station 100 to UEs is stored in the queues 108. For a particular downlink transmission, the scheduler 110 assigns available resources to respective UEs being served by the base station 100. Low latency data destined for low latency UEs is transmitted in the low latency resources 128, and latency tolerant data destined for latency tolerant UEs is scheduled in the latency tolerant resources 130 and/or low latency resources 128. The scheduler 110 uses an algorithm to decide which resources should be assigned to which UEs. An example of an algorithm that may be used by the scheduler 110, to assign resources for low latency traffic, is a delay-based algorithm that takes account of the latency constraints of the low latency traffic. When just latency tolerant traffic is present, a proportionally fair (PF) scheduling algorithm may be used. When a resource partition is assigned to a UE, an appropriate number of bits are removed from the queue corresponding to that UE and sent to the downlink physical layer. The error control coder 114 encodes the bits using an error control code to result in coded bits. One example of an error control code that may be applied by the error control coder 114 is a turbo code. The coded bits output from the error control coder 114 may be subject to rate matching in rate matcher 116. The rate matcher 116 may match the number of bits in a transport block to the number of bits that can be transmitted in the given allocation, and the rate matching may involve sub-block interleaving, bit collection, and/or pruning. The modulator 118 then modulates the coded bits to generate modulated symbols. The resource mapper 120 maps the modulated symbols to the resources assigned to the UE.

An example implementation of UE 104a is illustrated in more detail in FIG. 1 and includes one or more antennas 152 for receiving the downlink transmissions 124. Only one antenna 152 is illustrated. The UE 104a includes a receiver 154 for processing the received downlink transmissions 124. For example, the receiver 154 may implement downlink physical layer processing, such as decoding and demodulation to extract the data, pilot sequences and signaling destined for UE 104a. A decoder 155 for performing decoding is illustrated. The receiver 154 and the decoder 155 may each be implemented by a processor that executes instructions that cause the processor to perform the operations of the receiver 154 and the decoder 155. The same or different processor may be used to implement each of the receiver 154 and the decoder 155. Alternatively, the receiver 154 and/or the decoder 155 may be implemented using dedicated integrated circuitry, such as an ASIC, GPU, or a FPGA for performing the functions of the receiver 154 and/or the decoder 155. UE 104*b* has a similar structure to UE 104*a*.

Figure 2:
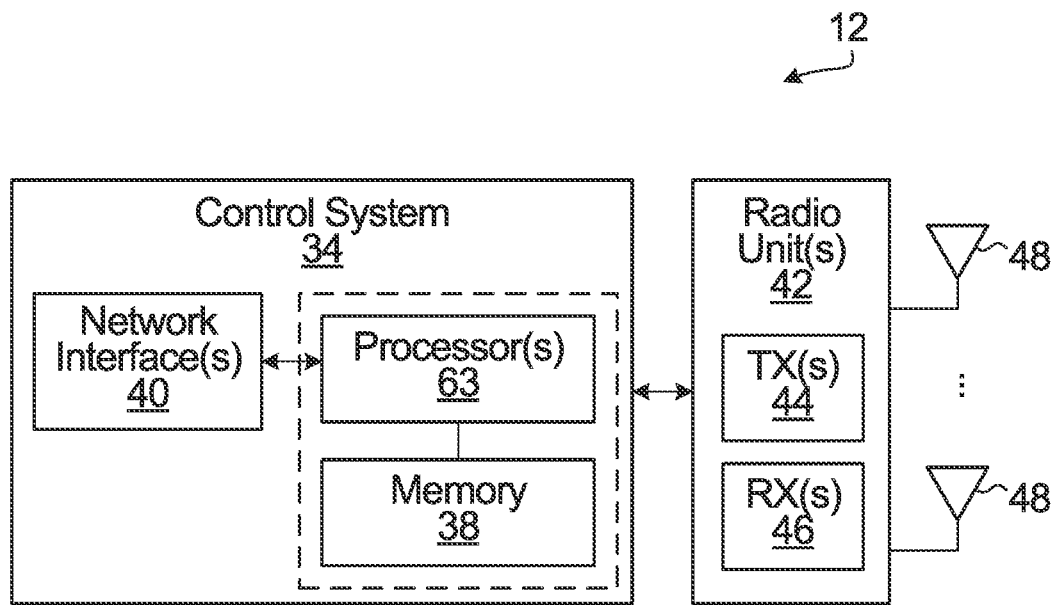
FIG. 2 is a schematic block diagram of a base station according to some embodiments of the present disclosure.

FIG. 2 is a schematic block diagram of a BS 12 according to some embodiments of the present disclosure. As illustrated, the BS 12 includes a control system 34 configured to perform the network-side functionality described herein. In some implementations, the control system 34 is in the form of circuitry configured to perform the network-side functions. In yet other implementations, the control system or circuitry 34 includes one or more processors 36 (e.g., CPUs, ASICs, FPGAs, and/or the like) and memory 38 and possibly a network interface 40. The BS 12 also includes one or more radio units 42 that each includes one or more transmitters 44 and one or more receivers 46 coupled to one or more antennas 48. In some other implementations, the functionality of the BS 12 described herein may be fully or partially implemented in software or modules that is, e.g., stored in the memory 38 and executed by the processor(s) 36.

In yet other implementations, a computer program including instructions which, when executed by at least one processor, causes the at least one processor to carry out the functionality of the BS 12 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 3:
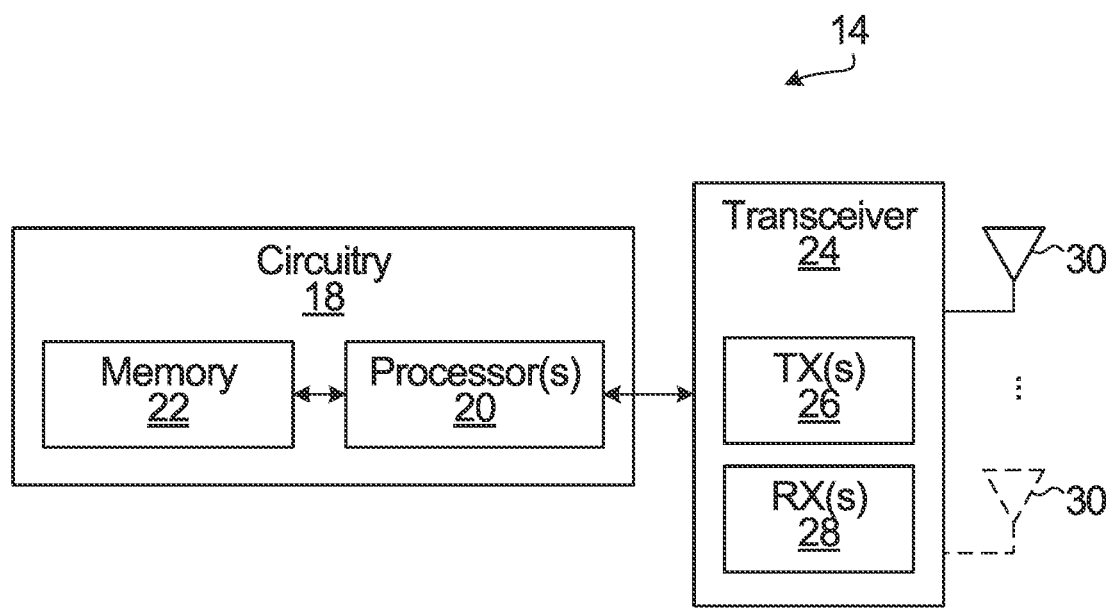
FIG. 3 is a schematic block diagram of a wireless device according to some embodiments of the present disclosure.

FIG. 3 is a schematic block diagram of a wireless device according to some embodiments of the present disclosure. As illustrated, the wireless device includes circuitry 18 configured to perform the wireless device functions described herein. In some implementations, the circuitry 18 includes one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some other implementations, the functionality of the wireless device 14 described herein may be fully or partially implemented in software or modules that is, e.g., stored in the memory 22 and executed by the processor(s) 20.

In yet other implementations, a computer program including instructions which, when executed by at least one processor, causes the at least one processor to carry out the functionality of the wireless device 14 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 4:
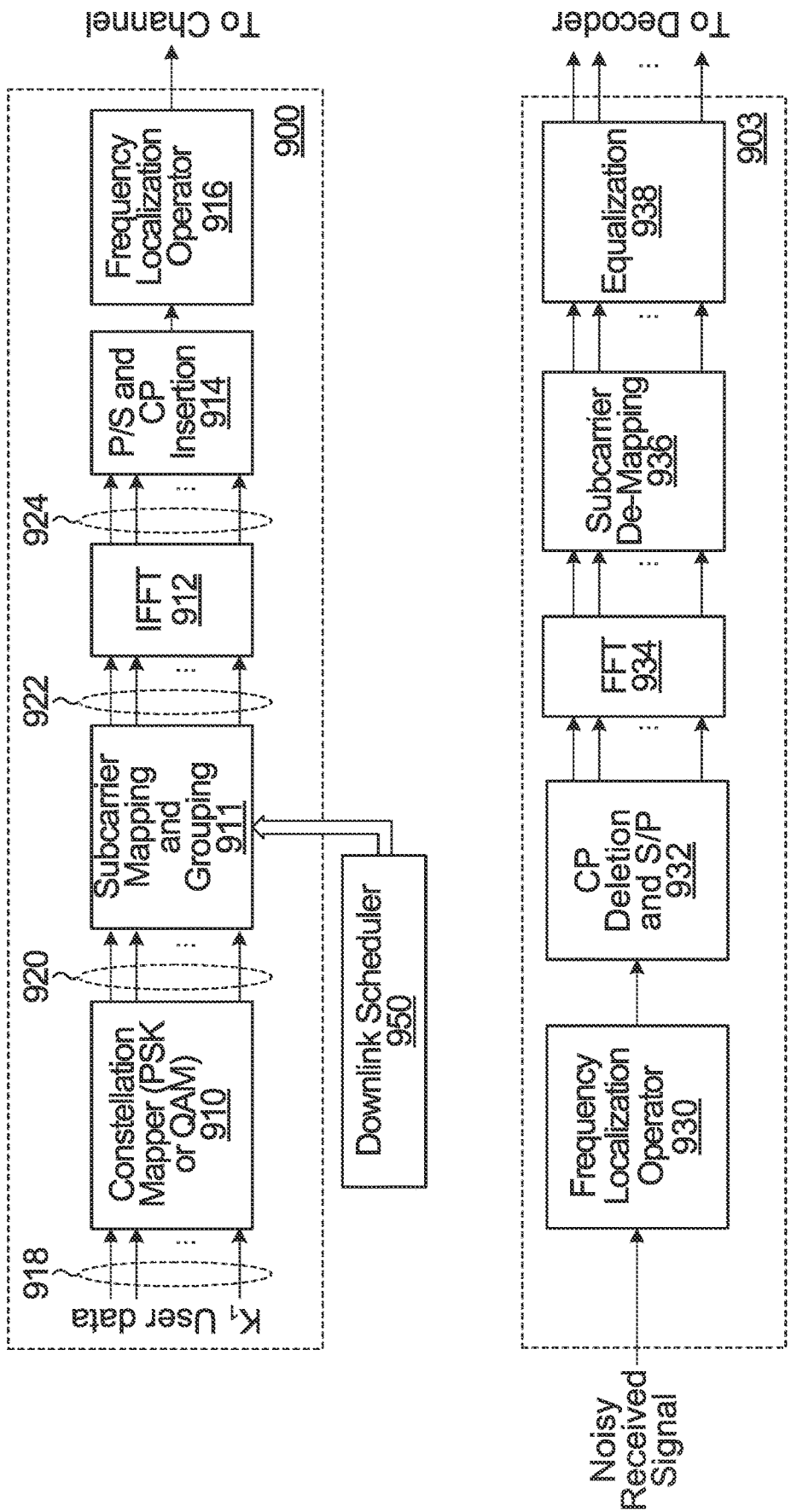
FIG. 4 is a block diagram of a base station with a transmit chain.

FIG. 4 is another example of a base station with a transmit chain generally indicated at 900, and a receive chain of a base station generally indicated at 903.

The transmit chain 900 includes a constellation mapper 910, sub-carrier mapping and grouping block 911, IFFT 912, pilot symbol and cyclic prefix insertion 914, and frequency localization operator 916 (for example filtering, sub-band filtering, windowing, sub-band windowing). Also shown is a downlink scheduler 950 that performs downlink scheduling.

In operation, constellation mapper 910 receives UE data (more generally, UE content containing data and/or signalling) for downlink transmission to $K_1$ UEs, where $K_1 \geq 1$. The constellation mapper 910 maps the UE data for each of the $K_1$ UEs to a respective stream of constellation symbols and outputs this at 920. The number of UE bits per symbol depends on the particular constellation employed by the constellation mapper 910. In the example of quadrature amplitude modulation (QAM), 2 bits from for each UE are mapped to a respective QAM symbol.

For each OFDM symbol period, the sub-carrier mapping and grouping block 911 groups and maps the constellation symbols produced by the constellation mapper 910 to up to P inputs of the IFFT 912 at 922. The grouping and mapping is performed based on downlink scheduling information received from the downlink scheduler 950, in accordance with a defined resource block definition and allocation for the content of the $K_1$ UEs being processed in transmit chain 900. As noted above, downlink transmissions are generally scheduled for all UEs. P is the size of the IFFT 912. Not all of the P inputs are necessarily used for each OFDM symbol period. The IFFT 912 receives up to P symbols, and outputs P time domain samples at 924. Following this, in some implementations, time domain pilot symbols are inserted and a cyclic prefix is added in block 914. The frequency localization operator 916 may, for example, apply a filter which limits the spectrum at the output of the transmit chain 900.

The receive chain 903 includes frequency localization operator 930, cyclic prefix deletion and pilot symbol processing 932, fast Fourier transform (FFT) 934, sub-carrier de-mapping 936 and equalizer 938. Each element in the receive chain performs corresponding reverse operations to those performed in the transmit chain. The receive chain 903 receives uplink signals generated in accordance with the scheduling information and/or resource allocation information generated by the scheduler and/or resource allocator 960. The sub-carrier de-mapper 936 makes also makes use of the scheduler information and/or resource allocation information from the scheduler and/or resource allocator 960.

When multiple numerologies are supported, as per the embodiments described in detail below, there may be corresponding multiple instances of the transmit chain 900 and the receive chain 903 in the base station.

Figure 5:
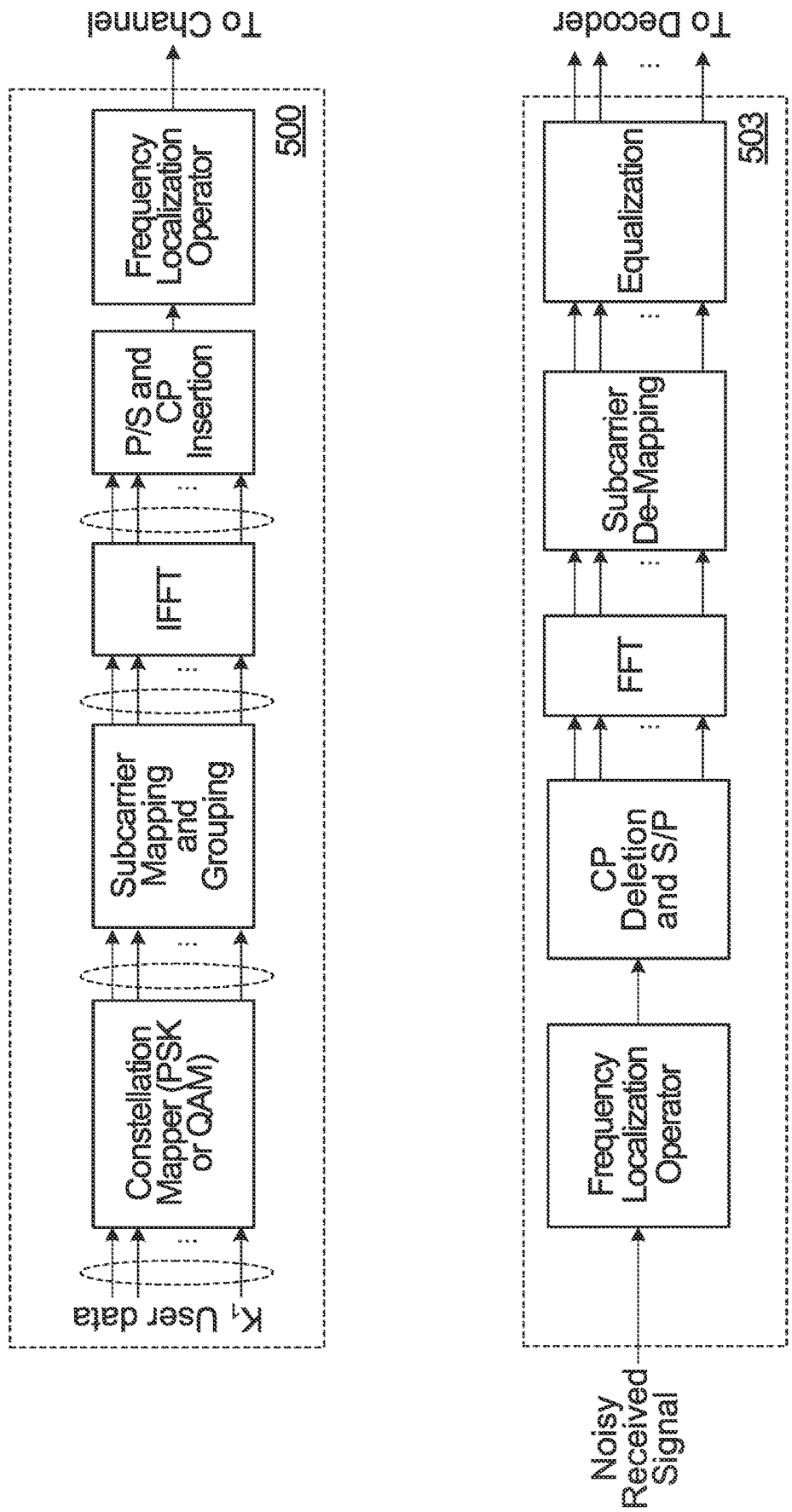
FIG. 5 is a block diagram of a UE with a transmit chain generally.

FIG. 5 is an example of a UE with a transmit chain generally indicated at 500, and a receive chain generally indicated at 503. The transmitter and receiver of a UE may be similar to those of a base station although there would be no scheduler in the UE. Rather, the UE will receive the scheduling information and/or the resource allocation information, and will receive downlink transmissions in accordance with the received scheduling information.

For efficient resource sharing, the transmission of latency tolerant communication and latency sensitive communication can be scheduled using the same or overlapping time-frequency resources.

To allow for improved latency to be provided for latency sensitive traffic compared to latency tolerant traffic, latency tolerant traffic has a scheduling interval longer than that of latency sensitive traffic.

Latency sensitive traffic scheduling can be achieved by pre-emption of resources which were originally scheduled for latency tolerant traffic. When this occurs, a pre-emption indication can be sent dynamically to notify the UE receiving latency tolerant traffic that part of its scheduled traffic has been pre-empted or postponed. The base stations of FIGS. 1, 2, and 4 are configured to generate and transmit pre-emption indications as described herein. The base stations schedule traffic for UEs, with the option of pre-empting such scheduled traffic to transmit latency sensitive traffic. When the pre-emption occurs, the base station sends the pre-emption indication. The UEs of FIGS. 1, 3, and 5 are configured to receive and process pre-emption indications as described herein. The UE receives scheduled traffic. The UE also receives the pre-emption indications, and when the pre-emption indication indicates that its scheduled traffic has been pre-empted, the UE adjusts its reception of received scheduled traffic to account for the pre-emption. Detailed examples are of the base station and UE functionality are provided below.

The pre-emption indication can be sent at the time of arrival of the latency sensitive traffic, near the end of scheduling interval of latency tolerant traffic either within the interval or near the beginning of next interval, or at the beginning of another following interval, for example when a re-transmission is scheduled after HARQ feedback.

The pre-emption indication can be explicit or implicit, and can be UE specific, or group-common. Group-common indications may be broadcast or multi-cast, for example. eMBB UEs can be configured to monitor the pre-emption indication. eMBB UEs can be configured via RRC signaling or a group-common PDCCH may notify a group of UEs whether they need to monitor pre-emption indication.

The pre-emption indication can indicate pre-emption to any granularity of time and/or frequency.

Furthermore, latency sensitive traffic may use a mini-slot (i.e., number of symbols less than slot) for transmission scheduling.

A transmission resource for a given UE, for example a time frequency resource scheduled for transmission of a TB, can be pre-empted for latency sensitive traffic in its entirety. When this is the case, the particular time frequency resource is said to be pre-empted. Alternatively, a part of the time frequency resource may be pre-empted for latency sensitive traffic, for example part of specific OFDM symbols. In this case, the particular time frequency resource or those specific symbols is said to be impacted by pre-emption. In either case, the transmission of the TB is impacted by pre-emption.

In the discussion that follows, reference is made to pre-emption, but it should be understood that in alternate embodiments, the provided approaches can be applied to impaction by pre-emption, or for both pre-emption and impaction by pre-emption.

For the purpose of this description, a subsequent transmission may refer to any transmission following the initial transmission and that subsequent transmission can be scheduled either before or after HARQ feedback. Sometimes a subsequent transmission is also called a retransmission. Alternatively, a subsequent transmission is only considered a re-transmission if it is scheduled after HARQ feedback. The embodiments described below are not limited to any specific definition of subsequent or retransmission, and generally apply to in respect of any transmission following the initial transmission of a packet/TB or a HARQ process.

UE-Specific Downlink Control Information (DCI) Format Design

A first embodiment provides a downlink control information format design to indicate pre-emption.

In accordance with this embodiment, a pre-emption indication is only transmitted in respect of an impacted resource of a transmission when a subsequent transmission is scheduled following the impacted transmission. A pre-emption indication is not sent if a subsequent transmission is not scheduled.

A UE-specific downlink control information (DCI) format is provided that include a field to indicate time-frequency information of location of the impacted/pre-empted area of the previous transmission.

The provided DCI format indicates the resources that were pre-empted in a previous transmission of the same HARQ process ID. A HARQ process includes an initial transmission and any retransmissions or subsequent transmissions.

The DCI format that includes a pre-emption indicator that includes at least the following fields:

HARQ process ID;

a field of N bits to indicate time-frequency regions of a previous transmission that were pre-empted. The value of N may be configurable.

In some embodiments, the pre-emption indicator is only sent in respect of an impacted transmission for which there is a subsequent transmission. The DCI also schedules the subsequent transmission, and in some embodiments, the existence of the pre-emption indicator also serves to indicate the subsequent transmission is not a new transmission. Thus, optionally, an NDI (new data indicator) field can be omitted from the DCI format.

The fields in the DCI format can also be augmented to schedule a subsequent transmission together with a new transmission. In that case, DCI format assigns resources for both subsequent and new transmission. Hence, in accordance with an embodiment of the invention, the DCI format indicates, explicitly or implicitly, one or more of the following:

time and/or frequency resources of pre-empted/impacted area of a previous transmission; for example, symbol(s) indices of the impacted transmission. As mentioned above, an N-bit field can be used to provide the pre-emption information.

time-frequency resource assignment and/or HARQ ID of a partial/subsequent/re-transmission of the pre-empted/impacted transport block (TB); for example, resource allocation over a group of RBs and symbols/slots.

time-frequency resource assignment and/or HARQ ID for a new transmission—for example, resource allocation over a group of RBs and symbols/slots.

A transmission (be it an initial transmission or a retransmission) to a given UE is composed of one or more transport blocks. A transmit block is transmitted using resource blocks (RBs), each resource block being a defined time-frequency resource. Optionally, resource blocks are organized into resource block groups (RBGs). In addition, in some embodiments, one TB is divided into code blocks (CBs). Optionally the code blocks are organized into code block groups (CBGs).

Example 1

In a first example, there is a dedicated pre-emption indication field. This may, for example, be an N bit field (N is configurable) that indicates pre-emption to a defined indication granularity. The indication granularity may, for example, be one of:
- code block (CB);
- code block group (CBG)
- symbol(s)
- symbol(s) and resource block group/bandwidth part For example, where the granularity is code block group, the N bits indicate which of N code block groups are pre-empted. Note that one CBG can be one CB as well, depending on the TB size.

Any of the granularities mentioned above can be used to convey pre-emption information related to an impacted transmission of a UE. This information can be provided via UE specific DCI or in a UE specific field or portion of a group-common signal/channel. Examples of group-common channel and/or structures are provided later.

Example 2

In a second example, rather than having a dedicated field, the pre-emption indication is based on one or more fields that have other purposes, such as modulation and coding scheme (MCS), redundancy version (RV), and others. For example, an initial transmission may use a first MCS that is one of 28 MCS levels signaled with a five bit MCS field. Note that here 28 MCS mentioned only as an example. For retransmission, a reduced set of MCS levels is possible, and can be signaled using fewer than the five bits. In this case, the unused bits can be used for some or all of the pre-emption indication.

In another example, an RV field is used to indicate pre-emption in respect of a previously scheduled transmission. An RV of a TB contains a portion of the encoded bits. When data is encoded, the encoded bits may be partitioned into different sets that possibly overlap with each other. Each set is a different RV. For example, some RVs may have more parity bits than other RVs. Each RV is identified by an RV index (e.g. RV 0, RV 1, RV 2, . . . etc.). Then one of the RV indices are indicated in the RV field. If a configured RV includes the area of pre-emption, then this RV can be indicated and no other explicit indication is needed.

However, sending a RV of a TB based on pre-empted area can be inefficient, if the amount of pre-emption is small and/or configured RVs do not match well the pattern or amount of pre-emption. In that case, number of bits in the RV field can be increased and more definitions or configurations of RVs can be supported to better match the pre-emption area. In some embodiments, configuration of a RV is based on code block group. In one example, a RV can be composed of one or more code-block group. If CBG based pre-emption indication is supported, then a RV that best matches the area of the impacted CBGs can be transmitted.

In one example, even if the UE decoded the impacted CBGs in the previous transmission, if a subsequent transmission is scheduled where impacted CBGs are transmitted, then the UE may update the decoding status of the impacted CBGs based on the decoding of the subsequent transmission and send HARQ feedback with the updated CBG decoding status.

In one example, an RV field may indicate one of K options, K being an integer K=>1. M out of K options can be used for TB-level re-transmission or subsequent transmission and K-M options can be used for CBG-based re-transmission or subsequent transmission. If some RVs are constructed/configured as a function of CBGs, higher layer signaling (e.g., RRC) may notify the UE the mapping between CBGs and RVs, i.e., a certain indicated RV relates to which CBG(s). This can enable a unified RV field construction which can be used for both CBG-level retransmission and TB-level retransmission. In another example, all K options can be used to indicate CBG-based RV configurations.

In one example, there are four bits in the RV field. A combination of four bits may refer to different sets of RVs for new and re-transmissions. For example, if it is new transmission, four bits may refer to a certain set of RVs. If it is retransmission, four bits may refer to a different set of RVs. These configurations are notified to the UE before, possibly via RRC signaling.

In another example, a DCI format has 4-bit RV field. The 4-bit RV field of a new transmission may indicate TB-level transmission, same as in LTE, where a RV corresponds to a set of encoded bits that forms a TB. For re-transmission, 4-bit RV field may refer to CBG-level retransmission where different RVs map to different combinations of CBGs. For example, RV2={CBG2, CBG3}. If a UE supports CBG-level transmission and/or CBG-level HARQ feedback, it can be configured to read the RV field in this manner. The number of bits in the RV field can be the maximum number of CBGs supported or less. Based on a resource allocation field and MCS, the UE can determine the size of the transmission; however there could be ambiguity as to which CBGs are re-transmitted following an initial transmission. Indication via the RV field can be helpful to resolve this ambiguity.

In another example, the explicit N-bit indication field notifies which CBGs were pre-empted. The RV field may correspond to each CBG or the whole transmission.

In another example, one or more bits in the RV field and one or more bits in the MCS field together may provide pre-emption indication information of a configured granularity, e.g., CBGs or symbol(s). Alternatively, such bits may also indicate which CBGs are being re-transmitted. As mentioned above, high dynamic range of MCS may not be needed and some bits can be used for pre-emption indication or CBG indication purpose.

Example 3

In a third example, the pre-emption indication is transmitted in a combination of a dedicated field, and one or more fields that have other purposes. For example, an explicit N-bit field and RV field together may provide information of the pre-empted/impacted time and/or frequency resources. The impacted/pre-empted portion can be scheduled as subsequent transmission.

In a specific example, there is a dedicated one bit field that indicates whether re-transmission is based on pre-emption or not. Then, in the case of pre-emption, one or more other new or existing fields are used to indicate the pre-emption information. For example, if the retransmission is happening following a pre-empted transmission, then the field that provides pre-emption information can be based on granularity of symbols or symbols and RBGs or other granularities mentioned above. If the re-transmission is following a HARQ feedback, then the field may provide information of which CBGs are transmitted or which RV is transmitted. In a specific example, the RV field may indicate a group of symbols that were pre-empted if the re-transmission is based on pre-emption or scheduled before HARQ feedback, whereas for other cases, the RV field can be used in a conventional manner for TB-level transmission or CBG-based transmission or to indicate which CBGs are being transmitted. This can be useful if subsequent transmission can be based on a different granularity than CBGs.

Example 4

In a further example, there is only one bit which indicates whether a pre-emption has occurred or not.

Unified UE-Specific DCI Format

In some embodiments, the UE specific pre-emption indication described above is used both to indicate pre-emption, and to indicate or facilitate retransmissions based on received HARQ feedback. In a specific example, this can be used as a unified indication if CBGs are chosen as granularity of indication. This can serve to indicate which CBGs are being retransmitted. It is unified in the sense that at different times, the same DCI format is used to indicate a set of CBGs have been pre-empted (and thus will be re-transmitted), and to indicate a set of CBGs that are being re-transmitted, for example based on previously received HARQ feedback. The HARQ feedback can be multi-bit feedback where each bit corresponds to the decoding status of a CBG. Thus, this DCI can be used before/in the absence of ACK/NACK based on pre-emption, or after receipt of ACK/NACK. Note that in the event of an error in the received ACK/NACK, this indication in the DCI can be used by the UE to identify which CBGs are being re-transmitted and the re-transmitted CBGs can be different from the CBGs that failed.

The indication of which CBGs are transmitted in a re-transmission can be used in both uplink and downlink grants.

In another example, separate DCI formats are provided for new and re-transmission. The DCI which is used for retransmission may include fields for CBGs and/or pre-emption indication, which may not be necessary in a DCI that schedules a new transmission. Similarly, RV field in the DCI that is used for re-transmission can be used in a different manner than the RV field in the DCI used for new transmission. This is because RV field configuration can be different for new and re-transmission; RV configuration for re-transmission can be based on CBG configuration. The RV field may have same or different number of bits in the two DCI that are used for new and re-transmissions. In such cases, NDI bits may not be necessary as separate DCIs are used for new and re-transmission.

DCI Design if Two Processes Scheduled by Same Grant

As detailed above, in some embodiments, a single DCI is used to schedule multiple HARQ processes of a UE. This can be CBG based, or symbol or RB based, for example. These can include scheduling for one or a combination of:
  one or multiple retransmissions due to pre-emption;
  one or more retransmissions based on HARQ feedback;
  one or more new transmissions.

This approach may be more efficient than separate scheduling. For example, a single grant may schedule re-transmission/subsequent transmission of HARQ process i and a new TB of a HARQ process j, where j≠i.

For this embodiment, the DCI format supports at least the following:
  indication of HARQ process IDs, both for re-transmission HARQ process and new transmission HARQ process;
  redundancy version information, both for re-transmission HARQ process and new transmission HARQ process;
  indication, for example, which CBGs or symbols of previous transmission are being re-transmitted (optional)
  NDI bits for CBG-based re-transmission (optional)

The DCI may include MCS and resource allocation fields that can be common between the multiple scheduling of HARQ processes. Note that multiple HARQ processes can be re-transmitted together with multiple new HARQ processes, for example, via MIMO transmission. In such cases, configuration details related to MIMO transmission need to be conveyed as well for each HARQ process.

For example, the DCI may indicate the number of RBs allocated. The UE will know which CBGs failed for the specified HARQ ID, and based on that a mapping rule is applied to determine where the CBGs for the retransmission are located. For example, the CBGs of a previous transmission may be transmitted in a first part of a slot. In this case, some padding may be applied so that the CBGs for the retransmission fill an integer number of REs, and so that a RE does not contain bits of two HARQ process IDs. Based on RV field with/without optional indication field and the mapping rule, the UE knows where CBG resource allocation ends within the slot and can determine the allocated REs for the retransmission. Resources for the new TB start immediately following those for the retransmission.

In another example, if explicit indication is provided which CBGs or symbols of a previous transmission are re-transmitted, the RV field for re-transmission can be omitted.

In another example, separate and/or explicit MCS and/or RV and/or time-frequency allocation and/or NDI is provided for re-transmission and new transmission in the DCI.

Multiple Group Common Signaling for Pre-Emption Indication

In another embodiment, a group-common physical downlink control channel (PDDCH) is sent every K symbols/slots, or every X ms to notify pre-emption indication information. K is a positive integer. A group-common PDCCH is for multiple UEs. The monitoring period can be cell-specific or group-specific or UE-spec and can be configured. In some embodiments, the location is not tied to any specific symbol or group of symbols of a slot, can be any symbol and it is configurable. The group-common PDCCH may have UE specific fields or common information that is read by all UEs that monitor the group-common PDCCH. X and/or K may be configured by higher layer signalling. Even though group-common PDCCH is discussed here, it is understood that the examples of content of group-common PDCCH or how resources in a group common signal are configured/partitioned can be applicable to any group-common signal/channel regardless of structure. Examples of group-common signalling are disclosed in U.S. Patent Application No. 62/475,762 filed Mar. 23, 2017 entitled "System and Method for Multiplexing Traffic", which is hereby incorporated by reference.

There may be one group-common PDCCH sent for a whole cell to notify pre-emption indication. In one example, if the group-common PDCCH is sent every K symbols, it may contain indication related to the pre-empted/impacted areas of transmissions over a group of symbols that appeared before the symbol that contains the group-common PDCCH. In one example, the group-common PDCCH may contain indication of pre-emption information related to transmissions over the last K symbols.

In another example, if the group-common PDCCH is sent every K symbols, it may notify the UEs having ongoing transmission that some part of the scheduled resources over a following group of symbols (this group of symbols may include the symbol containing the group-common PDCCH) are pre-empted and assigned to another DL transmission.

Depending on the length or duration of transmission, a UE may monitor several group-common PDCCHs where each group-common PDCCH provides pre-emption information for a part of the duration of scheduled transmission.

In some embodiments, there are multiple group-common PDCCH's within a cell, and some UEs are configured to observe one or multiple group-common PDCCH to gather pre-emption indication information for the UE. Multiple group PDCCHs to gather pre-emption information can be monitored by a UE in same or different symbols. In some embodiments, eMBB UEs are configured in this manner to monitor the signaling.

Figure 6:
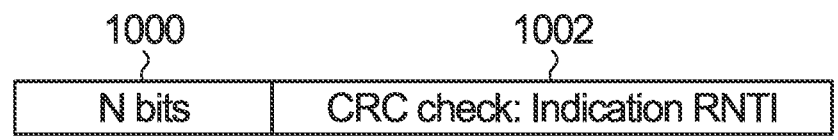
FIG. 6 is an example of a group-common signalling structure.

In a specific example, the group-common signaling has the structure depicted in FIG. 6 which includes N bits 1000, and a CRC check that is indicates a radio network temporary identifier (RNTI). The RNTI indicates the purpose of the PDCCH to be a pre-emption indicator. The N-bits contain time/frequency domain pre-emption to a defined or configured granularity for multiple UEs. The granularity can be only time domain or time- and frequency domain. Time domain information can be based on symbols. Frequency domain information can be group of RBs or bandwidth part or sub-band. Note that these granularities can be used in any group common signal or channel.

In some embodiments, the N-bits containing pre-emption information is divided into M fields, one or more of which may be UE specific. In this case, a given UE only needs to process the field(s) that are for it. If one or more fields are UE specific, different granularity options can be used for indication, for example, code block group, symbol(s), symbol(s) and group of RBs, symbol(s) and bandwidth part etc. Alternatively, as in previous embodiments, one or more fields are not UE specific but resource specific. A UE with knowledge of its scheduled resources can use such fields to identify whether there is a pre-emption occurred in part of its scheduled resources.

In some embodiments, previously transmitted signaling (e.g. RRC signaling) is used to inform each UE which portions of the N-bit field contain the indication for that UE or which field(s) in the group PDCCH belong to a UE. Alternatively, this information may be dynamically signaled. A UE may receive an indication in its DCI of which field(s) in one or more following group-common PDCCHs are configured for it. In another embodiment, a predetermined mathematical relationship is used to determine where/which field in the group-common PDCCH the indication information is sent for each UE. In a specific example, the group common signal contains M fields.

The information for a given UEk is in position given by:

$$\mathrm{mod}(i_k, M) + \mathrm{shift}_k$$

where $i_k$ is the position of the first resource block or a reference resource block (RB) among the RBs allocated to $UE_k$, and $\mathrm{shift}_k$ is a UE specific shift applied. The shift is applied such that each UE has a different position accounting for the modulo M operation. The shift can be indicated dynamically in the DCI. If M or less UEs are scheduled, then by using the shifts, each UE has a unique position within the DCI. As the group-common PDCCH has M fields in this embodiment, a BS may configure up to M UEs to monitor the group-common PDCCH. The applied shifts, $\mathrm{shift}_k$, can be from 0 to M−1 and $\log_2 M$ bits may be used as field.

In one example, DCI of a transmission can have multiple parts or stages. In one example, the DCI may have two parts. First part of the DCI provides scheduling information of the transport block and it comes at the beginning of the transmission interval or duration. A second part of the DCI, which may come near the end of the interval, notifies the UE of any pre-emption that has occurred during the scheduled transmission. If notification of pre-emption is received, the UE can monitor a group-common PDCCH in one or more of the subsequent symbols otherwise it does not need to monitor. The second part of the DCI may also contain the shift information mentioned above, if there is no dedicated field configured for the UE in a group-common PDCCH that provides information about the pre-empted time and/or frequency area. BS may notify up to M UEs in the event of a pre-emption if the group-common PDCCH has M fields.

In another example, the pre-emption indication of an impacted time and/or frequency area may be provided in the DCI of a subsequent transmission of the UE. The first and second parts of the DCI may include other informations or fields as well which are necessary for proper uplink and/or downlink transmission.

In some embodiments, multiple such group-common PDCCH can be sent every slot or after every period with a given duration. In some embodiments, the same content is sent on each of the multiple PDCCHs sent every slot. Alternatively, each of the PDCCHs may contain different content, this latter approach being more efficient for a UE that has a limited UE BW.

In some embodiments, a cell bandwidth is partitioned into bandwidth partitions, and a respective group-common PDCCH is sent for each of a plurality of bandwidth partitions. Transmission of a UE can occupy frequency resources that are parts of one or more of the plurality of bandwidth partitions. A given UE only needs to monitor the PDCCH(s) that are in respect of bandwidth partitions that overlap with the given UE's transmission. In this case, different content can be sent on each of the common PDDCH containing L bits of time-frequency information to a defined or configured granularity in time and/or frequency domain.

Figure 7:
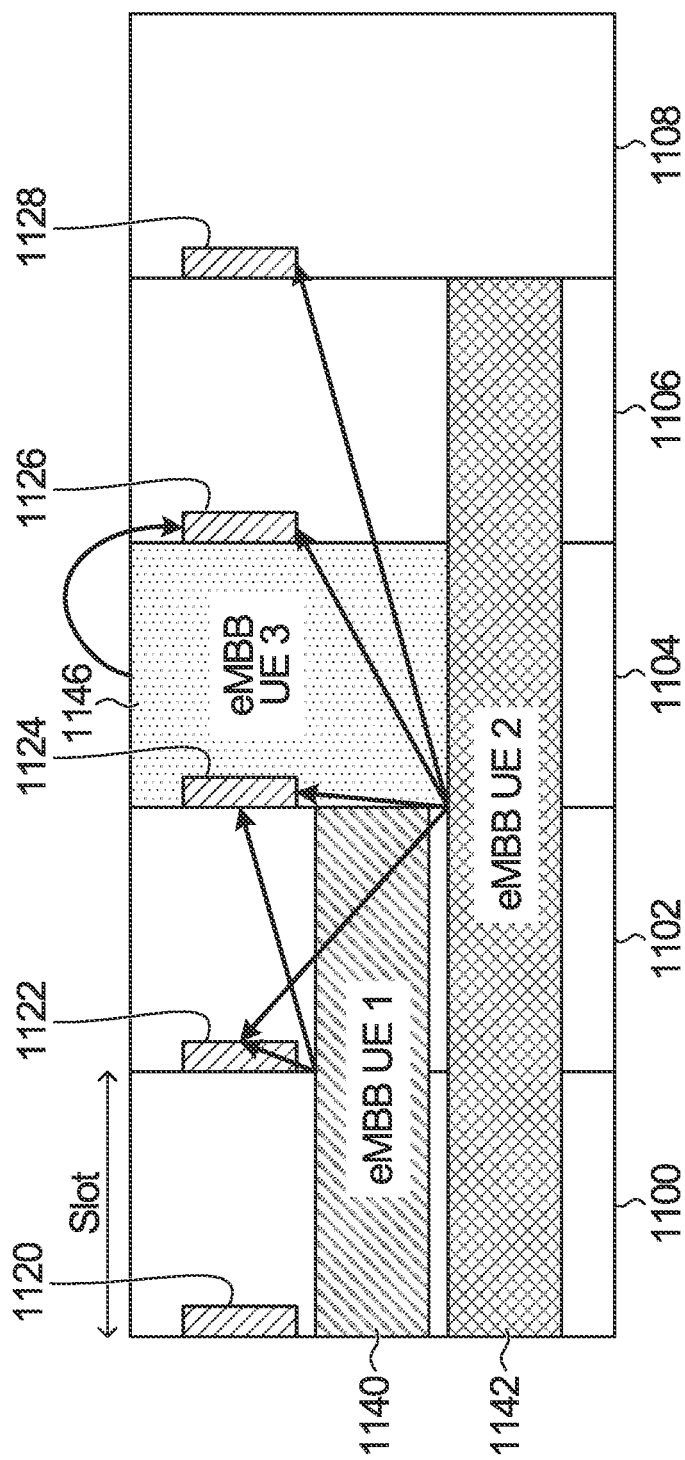
FIG. 7 is an example showing a group-common PDCCH sent every slot at the beginning of the slots.

FIG. 7 shows an example where a group-common PDCCH is sent every slot at the beginning of the slots. Shown are slots 1100,1102,1104,1106,1108 containing group-common PDCCH 1120,1122,1124,1126,1128. eMBB UE 1 (a UE having resource allocation 1140) will need to monitor group-common PDCCH 1122,1124. eMBB UE 2 (a UE having resource allocation 1142) will need to monitor group-common PDCCH 1122,1124,1126,1128. eMBB UE 3 (a UE having resource allocation 1146) will need to monitor group-common PDCCH 1126.

Figure 8:
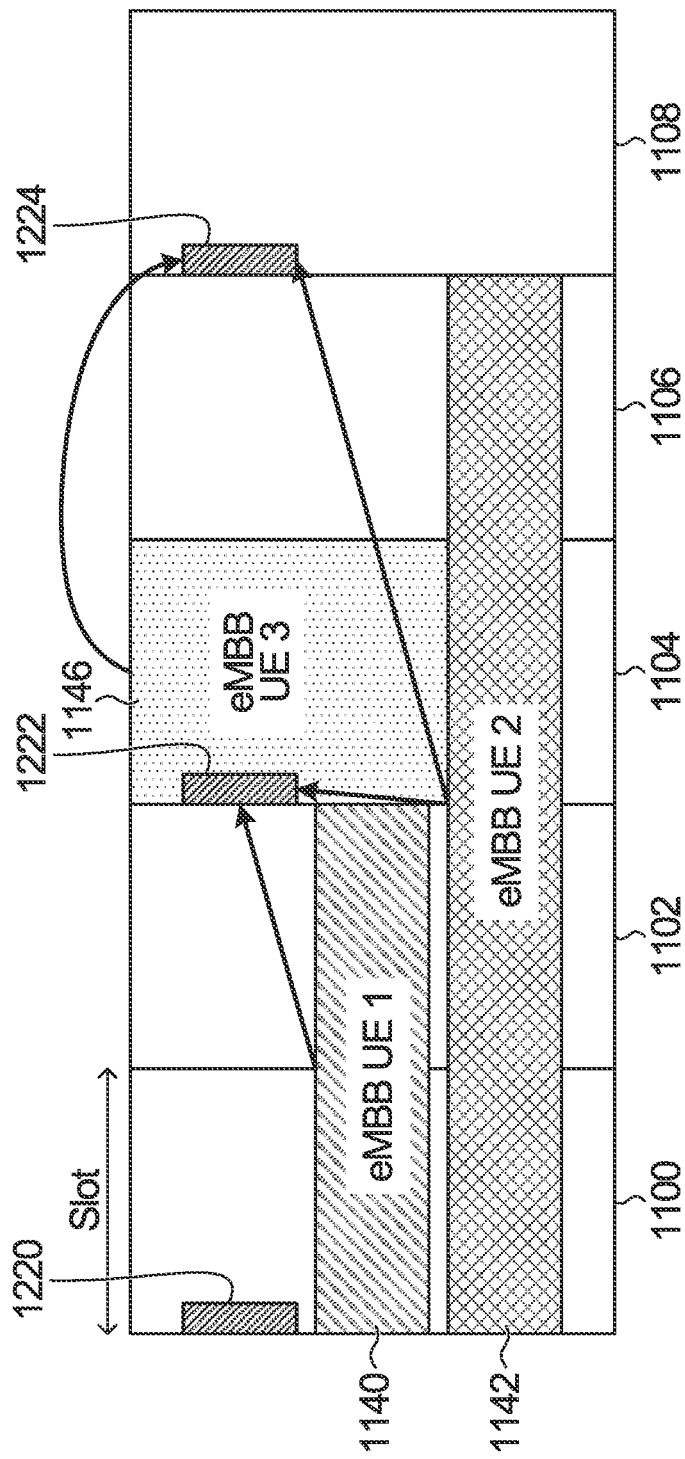
FIG. 8 is an example where a group-common PDCCH is sent every second slot at the beginning of the slots.

FIG. 8 shows an example where a group-common PDCCH is sent every second slot at the beginning of the slots. Shown are slots 1100,1102,1104,1106,1108. The first, third and fifth slots contain group-common PDCCH 1220, 1222,1224. eMBB UE 1 (a UE having resource allocation 1140) will need to monitor group-common PDCCH 1222. eMBB UE 2 (a UE having resource allocation 1142) will need to monitor group-common PDCCH 1222,1224. eMBB UE 3 (a UE having resource allocation 1146) will need to monitor group-common PDCCH 1224. Location for sending group-common PDCCH In some implementations, any symbol may have a configured PDCCH region. In some embodiments, one or multiple group-common PDCCH messages are transmitted every K symbols. The location of group-common PDCCH message may be inside an otherwise defined PDCCH region of a slot or outside, for example in the symbols containing packet data shared channel (PDSCH) of the slot.

Multiple sets of group-common PDCCH messages may be sent with differing periodicities. For example, a first set might be transmitted every $K_1$ symbols, while a second set is transmitted every $K_2$ symbols. One group of UEs may monitor every $K_1$ symbols, whereas another group of UEs monitor every $K_2$ symbols.

More generally, some control resource set(s) can be configured every K symbols to contain group-common PDCCH for sending pre-emption indication. The control resource set of group-common PDCCH may be located inside the PDCCH region of a symbol. That symbol may contain control resource sets of slot-based transmission. That symbol may contain control resource sets of mini-slot-based or symbol-based transmission. That symbol may contain both of the above.

In some embodiments, the group-common PDCCH falls inside the PDSCH of an eMBB transmission, and the UE is configured with the following behavior:

UE blindly detects the indication in the pre-configured search space which can be used for PDSCH transmission; or Reserved location, pre-configured control resource set area is avoided for PDSCH scheduling; or Group-common PDCCH is superposed with PDSCH transmission. MIMO transmission can be used in the overlapping region, or power domain non-orthogonal multiple access (NoMA) or code domain NoMA.

Other Possible Structure for Group-Common Channel

In one example, group-common channel containing pre-emption information may not appended with a CRC, like in a conventional PDCCH message. Instead, a group common channel can be sequence based. Some examples include channel structures of PUCCH or PHICH or PCFICH. Same as for group-common PDCCH channel, a group-common channel having a structure different from PDCCH, can have common information that is sent to a group of UEs or the group common signal may have UE specific field or bits. If it is sequence based, a codeword can be generated that contains pre-emption information. The codeword may contain either common information for a group of UEs or codeword may be partitioned into a sets of bits, where each set of bits contains pre-emption information for a UE. As mentioned above, one or multiple group common signal/channel can be configured to appear in any symbol and can be transmitted in a configured search space which may or may not be overlapped with data transmission.

Note that a group-common signal/channel may span one symbol or a group of continuous (i.e. contiguous) or non-contiguous symbols.

Multi-User Multiple Input Multiple Output (MU-MIMO) Transmission

Existing DL multiplexing approaches are based on pre-emption methods or power domain superposition. In another embodiment, instead of pre-emption, MU-MIMO transmission is employed such that multiple MIMO layers are available to transmit latency tolerant and intolerant traffic. The network may jointly transmit both latency tolerant and latency sensitive traffic over different MIMO layers over shared time-frequency resources. The mere existence of the latency intolerant traffic on one or more of the layers can effect performance for the latency tolerant traffic. For example, an eNB may transmit URLLC traffic over different MIMO layers in a time-frequency region that overlaps with an eMBB transmission. A URLLC UE may not be impacted, as the BS is aware of the ongoing transmission scheduled in the overlapping time-frequency region, and will configure it's beamforming matrices accordingly, based on the known interference scenario. However, a eMBB UE can be impacted, as the beamforming matrices configured for the duration of eMBB transmission may not be appropriate for the impacted region.

In some embodiments, an indication message is sent to the eMBB UE with time and/or frequency and/or beam related information of the impacted region. This message may also provide an update on the beamforming and/or interference channel information to facilitate interference cancellation by the eMBB UE.

In some embodiments, information related to demodulation reference signal (DM-RS) used by the BS to send data to the URLLC UE is indicated to the eMBB user in order for the latter to cancel the interference caused by the URLLC transmission on the impacted eMBB transmit block (TB). Such information may comprise, the time, frequency, code, sequence resources used to send the URLLC DM-RS. In some cases, less signaling overhead may be required if the eMBB UE blindly detects the URLLC DM-RS. For example, if the eMBB UE already knows the set of possible DM-RS ports, it can blindly perform the decoding assuming all such possibilities without the need of signaling the DM-RS port for the URLLC transmission, at the cost of more complex decoding at the eMBB UE.

In some embodiments, beam related information is signaled to the UE, such as information about which transmit beam (e.g. beam index) was used by the transmitter to send the URLLC data. Beam related information may also relate to the reception beam at the UE, especially in high frequency cases where beamforming is generally performed both at the transmitter and receiver sides to achieve a better link quality. In such a case, the beam related information may actually indicate to the UE which reception beam can be used to reduce the impact caused by the URLLC transmission.

Figure 9:
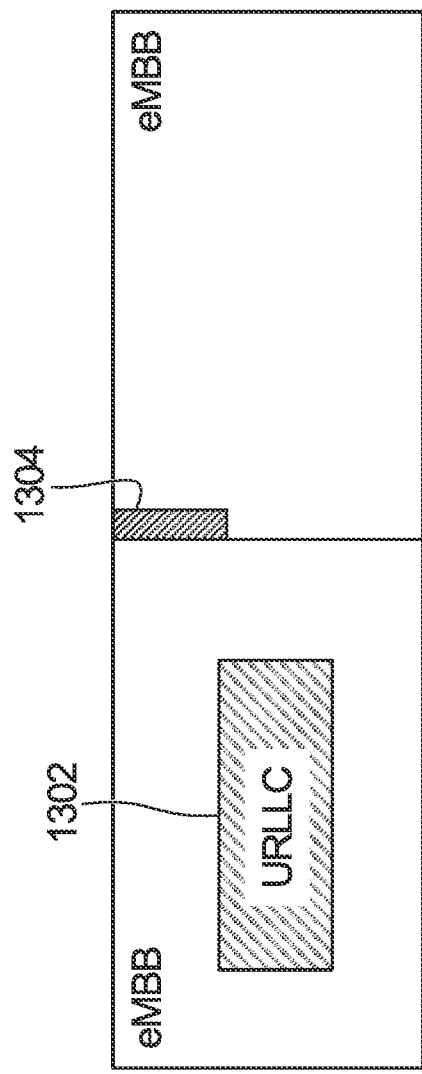
FIG. 9 is an example where a pre-emption indication is transmitted in a following eMBB transmission to indicate overlap between different MIMO layers in the previous eMBB transmission.

An example is shown in FIG. 9. Shown is a resource 1300 scheduled for eMBB transmission. Later, a resource 1302 is scheduled for URLLC traffic. This is not pre-emptive, but uses a different MIMO layer. However, the existence of the URLLC traffic will affect the ability of the eMBB UE to receive its transmission. An indication 1304 is sent at the start of a following eMBB transmission 1305. The location of indication shown here is only an example.

In another example, the indication can be located in any symbol, for example at the symbol(s) where URLLC traffic arrives, or any other subsequent symbol which can be inside the duration of the impacted transmission or outside. All the possible locations of UE specific PDCCH or group PDCCH discussed above can be applicable here. If the indication comes in a UE specific PDCCH, it can arrive when the UE receives its next PDCCH.

DCI Format Design for Indicating Duration

In another embodiment, a DCI format for indicating starting position and/or duration of a symbol-based and/or slot-based transmission is provided, Existing DCI formats for symbol-based transmission indicate a length, but the starting position is pre-defined, for example from the next symbol after control is located. Length can be also be indicated via higher layer.

However, in some implementations, data can start at the symbol of control or some other later symbol. In another embodiment, a DCI format for indicating start position and length is provided. In some embodiments, K possible values of start position are configured by higher layer signalling, and a specific one is signaled to the UE in the DCI. Alternatively, the starting position is notified via higher layer signaling and not included in DCI. The length indicates duration from the starting position. The length can be indicated as number of symbols, number of slots, or a combination of number of symbols and/or slot(s).

The following is a specific example of a format to indicate starting position and length in symbols or slots (although the same approach can be used for other granularities, e.g., group of contiguous symbols or group of contiguous slots):

field of $\log_2 K$ bits to indicate one of the K possible start positions, K may be configurable, or be transmitted in an another field; (optional, starting position can also be notified via higher layer).

field to indicate granularity—e.g. flag: 0/1 where 0→granularity is symbol, 1→granularity is slot; the Flag indicates the granularity for length indication and can be sent in DCI or notified via higher layer signalling, e.g., RRC signalling;

field containing $\log_2 M$ bits to indicate length, in the granularity indicated by the flag. M may be configured.

The field containing starting position is an optional field. If starting position is pre-configured, it may not need to be signalled in DCI. Also K starting positions can indicate position of a symbol or a slot where data duration starts from. UE can be configured via higher layer to understand whether notification of a value sent in the starting position field indicates a symbol or a slot. In one example, two K=2 options can be indicated, whether data can start from same symbol as control or next symbol in which case 1 bit suffices. In another example, where transmission is slot aggregated, two K=2 options can be indicated, whether data starts in the same slot where control is received or from next slot. K may also include a combination of location in terms of symbols and slots. In one example, K=4 options are supported as starting position. K={1, 2, 3, 4}.

| | |
|---|---|
| K = 1 | Data starts from same symbol as control |
| K = 2 | Data starts from next symbol after control |
| K = 3 | Data starts from second next symbol after control |
| K = 4 | Data starts from next slot |

In another embodiment, a DCI is provided that indicates lengths in symbols, slots or combinations thereof. The DCI includes the following fields:

field of $\log_2 K$ bits to indicate start position, K may be configurable (optional field, can also be pre-configured or notified via higher layer);

field containing $\log_2 J$ bits to indicate length, in the granularity of slots, J may be configurable;

field containing $\log_2 N$ bits to indicate length, in the granularity of symbols, N may be configurable.

This example can indicate length of any combination of symbols and slots.

Example 1

Figure 10:
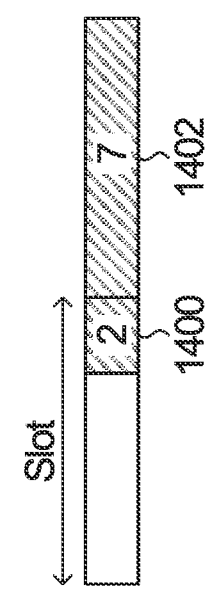
FIG. 10 is an example of pre-emption indication in which 9 symbols are indicated, and the start position is the 6th symbol of the slot.

In a first example, a slot length is 7 symbols, the number of symbols is up to 6 (configurable), and the number of slots that can be aggregated is up to 4 (configurable). An indication of a duration larger than 7 is obtained as an aggregation of symbols from 1 to 6, and slot(s). FIG. 10 shows an example in which 9 symbols are indicated, and the start position is the $6^{th}$ symbol of the slot. The indication refers to a mini-slot 1400 containing two symbols, and a slot 1402.

Example 2

Figure 11:
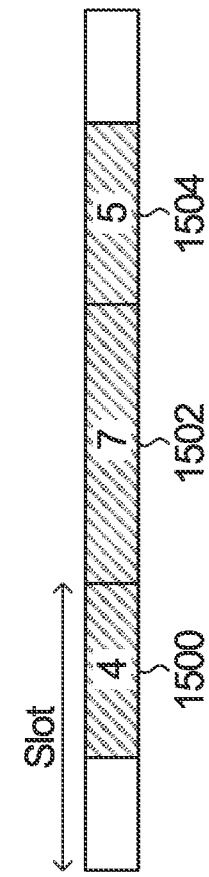
FIG. 11 is an example of pre-emption indication, where 16 symbols are indicated, and the start position is the 4th symbol of the slot.

In a second example, again there is a slot length of 7 symbols, the number of symbols is up to 12, and the number of slots is up to 4 (configurable). FIG. 11 shows an example, where 16 symbols are indicated, and the start position is the 4th symbol of the slot. The indication refers to nine symbols and one slot. In this case, the nine symbols are divided between a first mini-slot 1500 and a second mini-slot 1504 before and after slot 1502.

The second format can support length indication of mini-slot(s)+slot(s) or mini-slot+slot(s)+mini-slot. As the UE know where its control resource set is located where the slot boundary is, length indication is sufficient and exact order of symbols or slots may not need to be indicated.

Unified Scheduling Format

In some embodiments, a DCI format for symbol based transmission and slot based transmission that is unified. One or more of the following fields can be configurable for slot and symbol based scheduling.

1. Length/data duration indication (K1 options)
2. DM-RS configuration or antenna port indication (K2 options)
3. Starting position indication for data duration or the timing indication between DL grant assignment and when DL data transmission starts (K3 options).
4. Timing indication between UL grant assignment and when UL data transmission starts (K4 options).
5. Timing indication between DL data reception and corresponding acknowledgment/negative-acknowledgment (A/N) (K5 options).

Here, Ki, i={1, 2, . . . , 5}, options for the cases are chosen from a set of values that are configured by higher layer. In one example, both symbol based traffic and slot-based traffic can receive the same DCI where A/N timing are indicated from K5 options. The actual options may be different for mini-slot and slot-based traffic. The UEs are configured via higher layer to map which option to which value. For example, option 2 may correspond to two symbol delay for mini-slot based traffic which however corresponds to 2 slots delay for slot-based traffic. If a UE supports both mini-slot and slot-based traffic, then its K5 options are configured such that some options may refer to symbol(s) based timing and some options may refer to slot-based timing. Similar examples can be used for other four categories mentioned above.

DL Control Signaling to Modify a Previous Grant

In one embodiment, the network sends a first DL control signaling that contains grant for either an UL or DL transmission of a packet or a UE. At least a second DL control signaling is sent at a later time to modify the grant that was previously assigned for the same packet or a UE. The second DL control signaling can arrive before or after the UL or DL transmission is scheduled to start. The first DL control signaling can be UE specific. The second DL control signaling can be UE specific or group-common, i.e., broadcast or multicast. The modification of the assigned grant can be dropping the grant for the entire scheduled transmission, modify the time-frequency resources assigned originally for entire or part of the scheduled transmission, pre-empting or postponing part of the resources assigned to the scheduled transmission, adjusting transmission parameters, e.g., MCS, power or RV or repetition number. UE can be configured (e.g., by RRC signaling) to monitor at least one subsequent control signaling that may be sent to modify the previously allocated grant.

Mini-Slot Scheduling

In some existing systems, scheduling is performed in a manner that avoids reserved resources. For example, eMBB bandwidth may also contain channels containing important system information, e.g., PS, SS, PBCH, SIB, Paging. URLLC UEs who are expected to be scheduled in that BW can be informed of these reserved resources, e.g., via higher layer or other broadcast signaling. The UE may receive this information via initial configuration, or via RRC signaling. Hence, UE receive data over a region that includes some reserved resources, UE may not expect data transmission over the reserved resources and data transmission can be rate matched around the reserved REs/symbols.

In some embodiments, the DCI of a mini-slot may dynamically avoid scheduling mini-slot traffic over those REs for the reserved resources. This is to avoid the frequency band assigned to common channels, such as synchronization channel and broadcast channel. Here, mini-slot refers to symbol(s)-based transmission.

Signaling can be transmitted to indicate the location of pre-reserved frequency resources for common channels. This signaling can also be used for notifying URLLC UE of eMBB control and/or DMRS location, and notify the UE that its data cannot pre-empt these resources.

Mini-Slot Control Avoidance by Slotted Traffic

Figure 12:
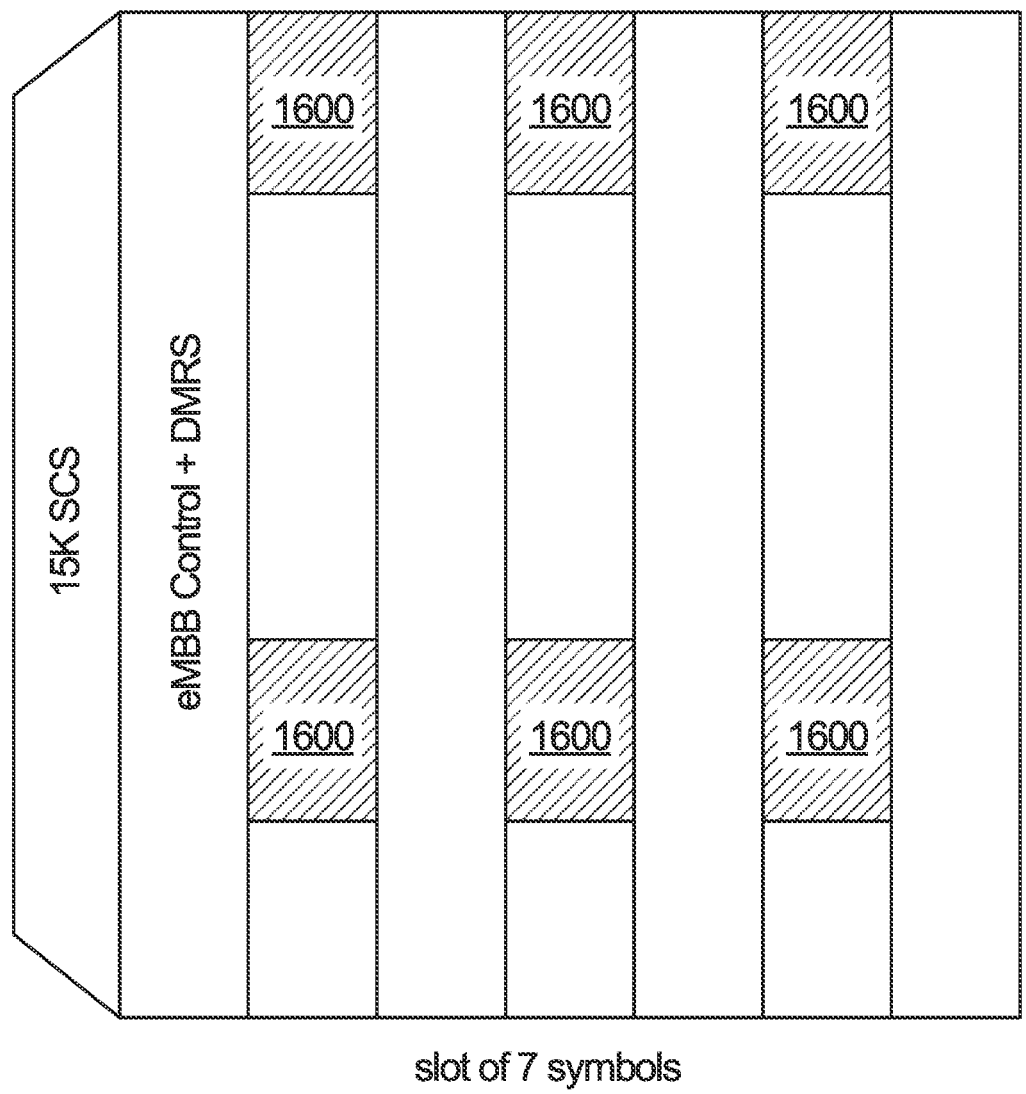
FIG. 12 is an example of a mini-slot structure where control resources are set aside in every second symbol.

In some embodiments, mini-slot based traffic (e.g. URLLC) can be scheduled during an ongoing slot-based transmission (e.g. eMBB). Every n symbol within the slot may contain control resource sets of mini-slot based UEs (n=1, 2, 3 etc.). An example is shown in FIG. 12 where control resources 1600 are set aside in every second symbol.

In some embodiments, when slot based traffic is scheduled, the slot-based traffic is scheduled including the mini-slot control region. If mini-slot traffic is scheduled, a pre-emption indication is transmitted which indicates which region was pre-empted by mini-slot control and/or mini-slot traffic.

In another embodiment, mini-slot control regions are avoided when slot-based traffic is scheduled. In this case, some locations for mini-slot control monitoring symbols can be pre-configured and broadcast to all UEs in semi-static manner. It can also be signaled via RRC signaling.

A slot-based UE receives the broadcast information, and knows the mini-slot control resource set locations. If the slot-based UE is scheduled in overlapping resources, the slot-based UE assumes no data is sent over those areas. Mini-slot control resource set can include both UE specific and group common control (e.g., A/N for grant free transmission).

In another embodiment, a method of flexible mini-slot scheduling is provided. In this embodiment, a control region, for example either in PDCCH or in PDSCH region, can be re-used or avoided, based whether the control region is being used or not. Pre-configured areas for control in PDSCH, e.g., system info, indication signaling, DMRS etc. are avoided.

A mini-slot DCI can allocate resources in the granularity of physical resource block (PRB) and symbol.

Example: $1^{st}$ symbol 12 RBs are used, $2^{nd}$ symbol 10 RBs are used. Hence, a bitmap can be signaled for time and frequency resources allocation, where granularity of bitmap in time and frequency can be configurable, e.g., symbol or symbol group and RB or RBG etc.

This may result in increased overhead, but may be needed if mini-slot based UE is not aware of skipped resources. For example, pre-emption indication may be signaled at the end of a slot and the pre-emption indication REs may need to be dynamically avoided when mini-slot traffic is scheduled. In another example, mini-slot scheduling assumes that the REs containing pre-emption indication are reserved and hence, mini-slot based UE would not receive data over those REs even if those areas are included in resources allocation, i.e., dynamic indication for avoiding those REs is not needed if those areas are known in advance.

Figure 13:
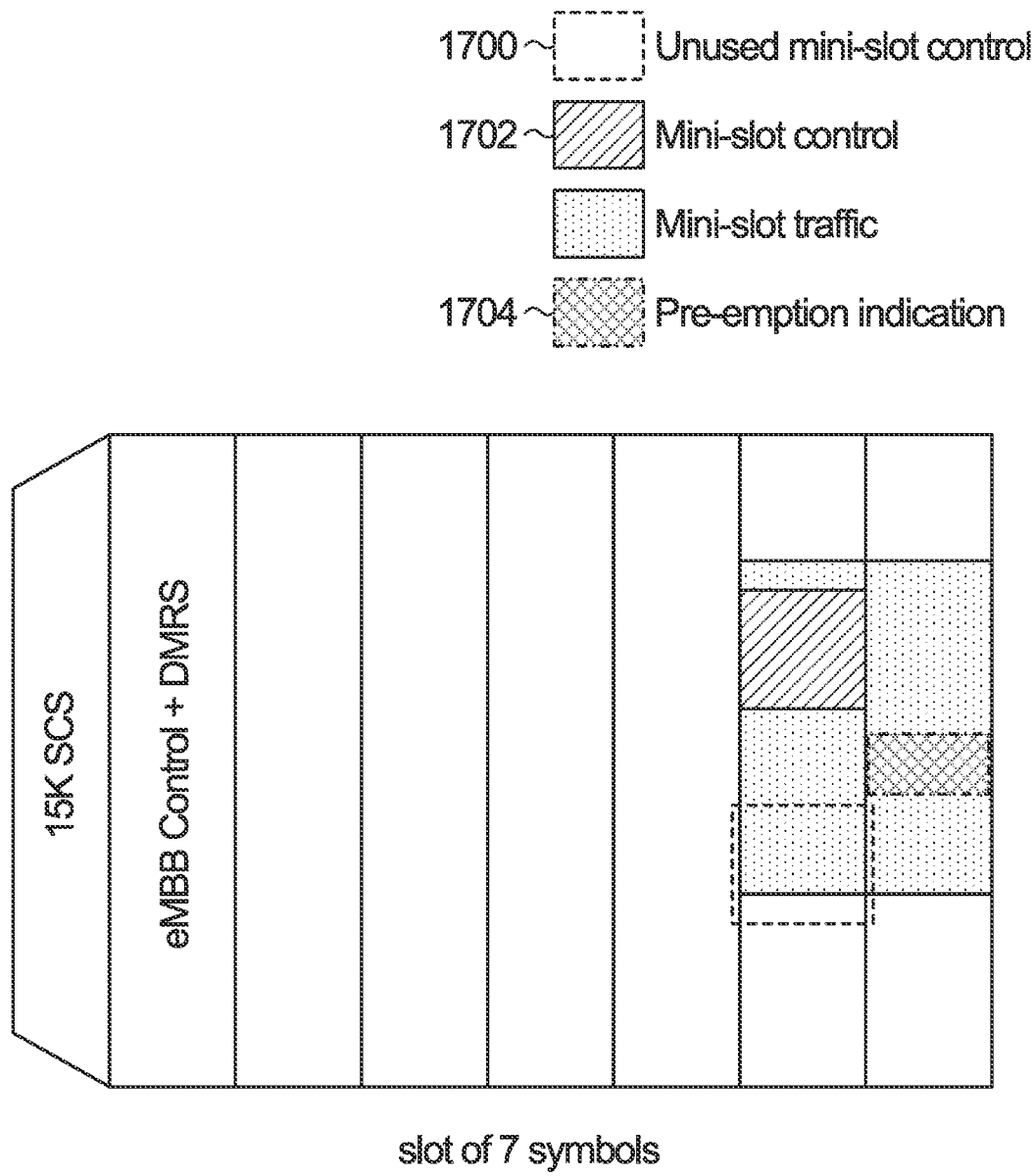
FIG. 13 is an example of a mini-slot control region, where eMBB traffic can use resources that overlap with unused control resources.

An example is shown in FIG. 13 which shows a slot of 7 symbols. There is an area 1700 that is an unused mini-slot control region, and an area 1702 which is a used mini-slot control region. In this situation, the eMBB traffic can use the resources that overlap with unused control area 1700, but should avoid the resources that overlap with used control area 1702. A pre-emption indication is sent at 1704 to indicate that the eMBB traffic is pre-empted in region 1702.

Numerous modifications and variations of the present disclosure are possible in light of the above teachings. It is therefore to be understood that within the scope of the appended claims, the disclosure may be practiced otherwise than as specifically described herein.

What is claimed is:

1. A method comprising:
every K symbols, on a group-common physical downlink control channel (PDCCH):
transmitting, by a network device in a wireless network to a first user equipment (UE), a pre-emption indication message including a pre-emption indication,
wherein the pre-emption indication indicates which resources within the K symbols preceding the pre-emption indication are pre-empted, wherein the pre-emption indication uses a radio network temporary identifier (RNTI) to indicate that the group-common PDCCH carries the pre-emption indication, and wherein K is a positive integer.

2. The method of claim 1, wherein the transmitting the pre-emption indication message comprises transmitting the group-common PDCCH in a control resource set.

3. The method of claim 2, further comprising:
transmitting higher layer signaling configuring the control resource set to be used to transmit the pre-emption indication.

4. The method of claim 1, further comprising:
transmitting a configuration of a value for K via higher layer signaling.

5. The method of claim 1, wherein, for each pre-emption indication, the K symbols are last K symbols preceding a symbol containing the each pre-emption indication.

6. The method of claim 1, wherein the pre-emption indication contains N bits, each bit of the N bits indicating pre-emption to a defined granularity in time or in frequency.

7. The method of claim 1, wherein the pre-emption indication includes multiple resource specific fields.

8. A method comprising:
every K symbols, on a group-common physical downlink control channel (PDCCH):
receiving, by a first apparatus from a network device, a pre-emption indication message including a pre-emption indication,
wherein the pre-emption indication indicates which resources within the K symbols preceding the pre-emption indication are pre-empted, wherein the pre-emption indication uses a radio network temporary identifier (RNTI) to indicate that the group-common PDCCH carries the pre-emption indication, and wherein K is a positive integer.

9. The method of claim 8, further comprising:
receiving a configuration of a value for K via higher layer signaling.

10. The method of claim 8, wherein, for each pre-emption indication, the K symbols are last K symbols preceding a symbol containing the each pre-emption indication.

11. The method of claim 8, wherein the pre-emption indication contains N bits, each bit of the N bits indicating pre-emption to a defined granularity in time or in frequency.

12. The method of claim 8, wherein the pre-emption indication includes multiple resource specific fields.

13. A network device comprising:
at least one processor; and
a non-transitory computer readable storage medium storing programming, the programming including instructions for execution by the at least one processor to cause the network device to:
every K symbols, on a group-common physical downlink control channel (PDCCH):
transmit, to a first user equipment (UE), a pre-emption indication message including a pre-emption indication,
wherein the pre-emption indication indicates which resources within the K symbols preceding the pre-emption indication are pre-empted, wherein the pre-emption indication uses a radio network temporary identifier (RNTI) to indicate that the group-common PDCCH carries the pre-emption indication, and wherein K is a positive integer.

14. The network device of claim 13, wherein the pre-emption indication message further includes beamforming information or interference channel information for facilitating interference cancellation by the first UE.

15. The network device of claim 14, the programming further including instructions for execution by the at least one processor to cause the network device to:
transmit, to the first UE, a first transmission on a first multiple-input and multiple-output (MIMO) layer; and
transmit, to a second UE, a second transmission on a second MIMO layer different from the first MIMO layer, wherein the pre-emption indication further indicates that the first transmission is impacted by the second transmission.

16. The network device of claim 15, wherein the pre-emption indication further indicates an impacted frequency resource or an impacted time resource of the first transmission.

17. The network device of claim 15, wherein the interference channel information in the pre-emption indication message includes information related to a demodulation reference signal (DM-RS) used by the network device corresponding to the second transmission transmitted to the second UE on the second MIMO layer.

18. The network device of claim 13, wherein instructions to cause the network device to transmit the pre-emption indication message include instructions to cause the network device to transmit the group-common PDCCH in a control resource set.

19. The network device of claim 18, the programming further including instructions for execution by the at least one processor to cause the network device to:
transmit higher layer signaling configuring the control resource set to be used to transmit the pre-emption indication.

20. The network device of claim 13, the programming further including instructions for execution by the at least one processor to cause the network device to:
transmit a configuration of a value for K via higher layer signaling.

21. The network device of claim 13, wherein, for each pre-emption indication, the K symbols are last K symbols preceding a symbol containing the each pre-emption indication.

22. The network device of claim 13, wherein the pre-emption indication contains N bits, each bit of the N bits indicating pre-emption to a defined granularity in time or in frequency.

23. A first apparatus comprising:
at least one processor; and
a non-transitory computer readable storage medium storing programming, the programming including instructions for execution by the at least one processor to cause the first apparatus to:
every K symbols, on a group-common physical downlink control channel (PDCCH):
receive, from a network device, a pre-emption indication message including a pre-emption indication,
wherein the pre-emption indication indicates which resources within the K symbols preceding the pre-emption indication are pre-empted, wherein the pre-emption indication uses a radio network temporary identifier (RNTI) to indicate that the group-common PDCCH carries the pre-emption indication, and wherein K is a positive integer.

24. The first apparatus of claim 23, wherein the pre-emption indication message further includes beamforming information or interference channel information for facilitating interference cancellation by the first apparatus.

25. The first apparatus of claim 24, the programming further including instructions for execution by the at least one processor to cause the first apparatus to:
receive, from the network device, a first transmission on a first multiple-input and multiple-output (MIMO) layer of the network device,
wherein the pre-emption indication further indicates that the first transmission is impacted by a second transmission transmitted to a second apparatus on a second MIMO layer of the network device, the second MIMO layer being different from the first MIMO layer.

26. The first apparatus of claim 25, wherein the pre-emption indication further indicates an impacted frequency resource or an impacted time resource of the first transmission.

27. The first apparatus of claim 25, wherein the interference channel information in the pre-emption indication includes information related to a demodulation reference signal (DM-RS) used by the network device corresponding to the second transmission transmitted to the second apparatus on the second MIMO layer.

28. The first apparatus of claim 27, wherein the interference channel information in the pre-emption indication indicates at least one of time, frequency, code, or sequence resources used to send the DM-RS.

29. The first apparatus of claim 24, the programming further including instructions for execution by the at least one processor to cause the first apparatus to:
perform beam forming based on the beamforming information in the pre-emption indication; or
perform the interference cancellation based on the interference channel information in the pre-emption indication.

30. The first apparatus of claim 23, wherein the instructions to cause the first apparatus to receive the pre-emption indication message include instructions to cause the first apparatus to receive the group-common PDCCH in a control resource set, and wherein the control resource set is configured via higher layer signaling.

31. The first apparatus of claim 23, the programming further including instructions for execution by the at least one processor to cause the first apparatus to:

receive a configuration of a value for K via higher layer signaling.

32. The first apparatus of claim 23, wherein, for each pre-emption indication, the K symbols are last K symbols preceding a symbol containing the each pre-emption indication.

33. The first apparatus of claim 23, wherein the pre-emption indication contains N bits, each bit of the N bits indicating pre-emption to a defined granularity in time or in frequency.

34. The first apparatus of claim 23, wherein the pre-emption indication includes multiple resource specific fields.

\* \* \* \* \*